(12) United States Patent
Wang et al.

(10) Patent No.: US 11,933,946 B2
(45) Date of Patent: Mar. 19, 2024

(54) OPTICAL IMAGING LENS

(71) Applicant: GENIUS ELECTRONIC OPTICAL (XIAMEN) CO., LTD., Fujian (CN)

(72) Inventors: Pei-Chi Wang, Taichung (TW); Yi-Ling Huang, Taichung (TW)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 292 days.

(21) Appl. No.: 16/939,084

(22) Filed: Jul. 27, 2020

(65) Prior Publication Data

US 2021/0364745 A1 Nov. 25, 2021

(30) Foreign Application Priority Data

May 22, 2020 (CN) .......................... 202010440277.1

(51) Int. Cl.
*G02B 13/00* (2006.01)
*G02B 9/62* (2006.01)
*G02B 27/00* (2006.01)

(52) U.S. Cl.
CPC .......... *G02B 13/0045* (2013.01); *G02B 9/62* (2013.01); *G02B 27/0025* (2013.01)

(58) Field of Classification Search
CPC .............. H04N 5/2254; G02B 27/0012; G02B 27/0025; G02B 13/0045; G02B 13/06;
(Continued)

(56) References Cited

U.S. PATENT DOCUMENTS 10,197,774 B1 2/2019 Teraoka et al.
2005/0248857 A1* 11/2005 Wada .................. G02B 27/646
359/748

(Continued)

FOREIGN PATENT DOCUMENTS

CN 204374504 6/2015
CN 204575949 8/2015
(Continued)

OTHER PUBLICATIONS

"Office Action of China Counterpart Application", dated Aug. 27, 2021, p. 1-p. 21.

*Primary Examiner* — Travis S Fissel
(74) *Attorney, Agent, or Firm* — JCIPRNET

(57) ABSTRACT

An optical imaging lens includes first, second, third, fourth, fifth, and sixth lens elements sequentially along an optical axis from an object side to an image side. Each of the first to the sixth lens elements includes an object-side surface facing the object side and allowing imaging rays to pass through and an image-side surface facing the image side and allowing the imaging rays to pass through. The optical imaging lens satisfies conditions of Gallmax/Fno≥3.600 millimeters, EFL/ImgH≥3.200, and Gallmax/Tavg≥3.300; here, Gallmax represents a largest air gap along the optical axis between the first lens element and an image plane, Fno, EFL, and ImgH respectively represent an F-number, an effective focal length, and an image height of the optical imaging lens, and Tavg represents an average lens element thickness of all of the lens elements along the optical axis from the object side to the image plane.

19 Claims, 14 Drawing Sheets

(58) Field of Classification Search
CPC ...... G02B 13/18; G02B 13/04; G02B 13/001; G02B 9/62; G02B 9/64
USPC ....... 359/757, 759, 755, 756, 713, 754, 751, 359/752, 750, 766
See application file for complete search history.

(56) References Cited

U.S. PATENT DOCUMENTS

| | | | | |
|---|---|---|---|---|
| 2009/0303596 | A1* | 12/2009 | Ryu | ............. G02B 27/646 |
| | | | | 359/557 |
| 2011/0128418 | A1* | 6/2011 | Iiyama | ........... G02B 15/144515 |
| | | | | 348/E5.055 |

FOREIGN PATENT DOCUMENTS

| | | | | |
|---|---|---|---|---|
| CN | 105572848 | | 5/2016 | |
| CN | 105676425 | | 6/2016 | |
| CN | 106597634 | | 4/2017 | |
| CN | 106990511 | | 7/2017 | |
| CN | 206946086 | | 1/2018 | |
| CN | 107741632 | | 2/2018 | |
| CN | 107741632 A | * | 2/2018 | ............. G02B 13/02 |
| CN | 107817594 | | 3/2018 | |
| CN | 108287403 | | 7/2018 | |
| CN | 109633861 | | 4/2019 | |
| CN | 110456488 | | 11/2019 | |
| CN | 111025542 | | 4/2020 | |
| JP | 2000035534 | | 2/2000 | |
| JP | 2002162562 | | 6/2002 | |
| JP | 2010014897 | | 1/2010 | |
| JP | 2011123304 | | 6/2011 | |
| JP | 2013003174 | | 1/2013 | |
| JP | 2014044373 | | 3/2014 | |
| JP | 2014109764 | | 6/2014 | |
| JP | 2015169889 | | 9/2015 | |
| JP | 2015536488 | | 12/2015 | |
| JP | 2018180339 | | 11/2018 | |
| KR | 20140071869 | | 6/2014 | |
| TW | 201727305 | | 8/2017 | |
| WO | WO-2020024631 A1 | * | 2/2020 | ......... G02B 13/0045 |

* cited by examiner

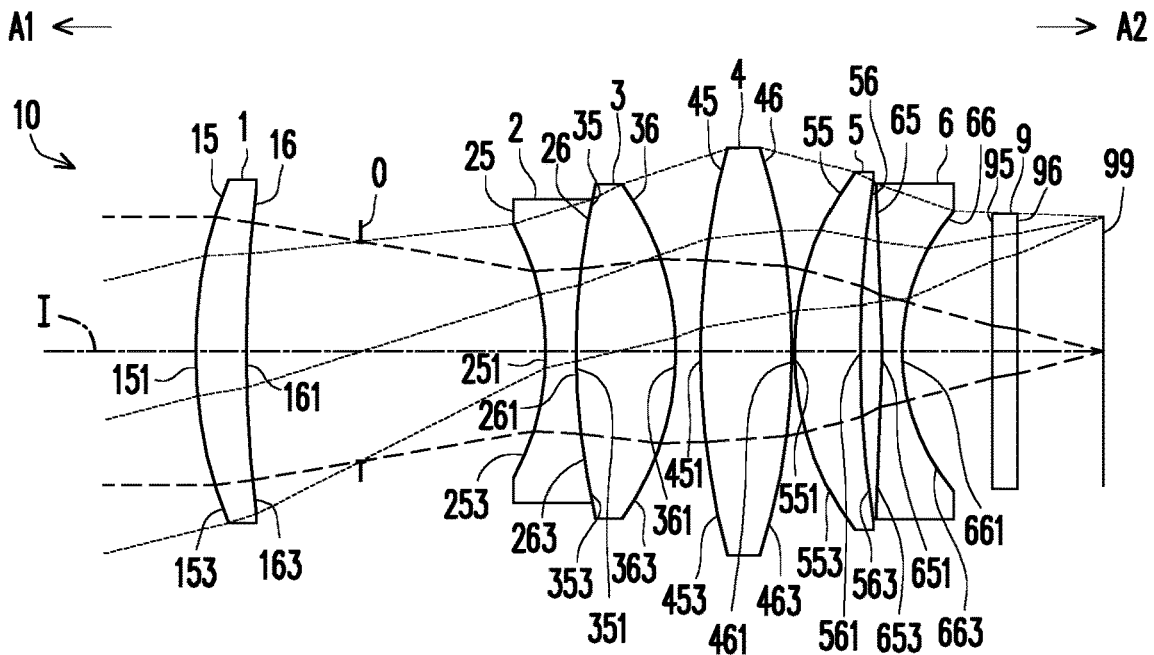
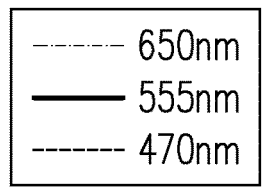
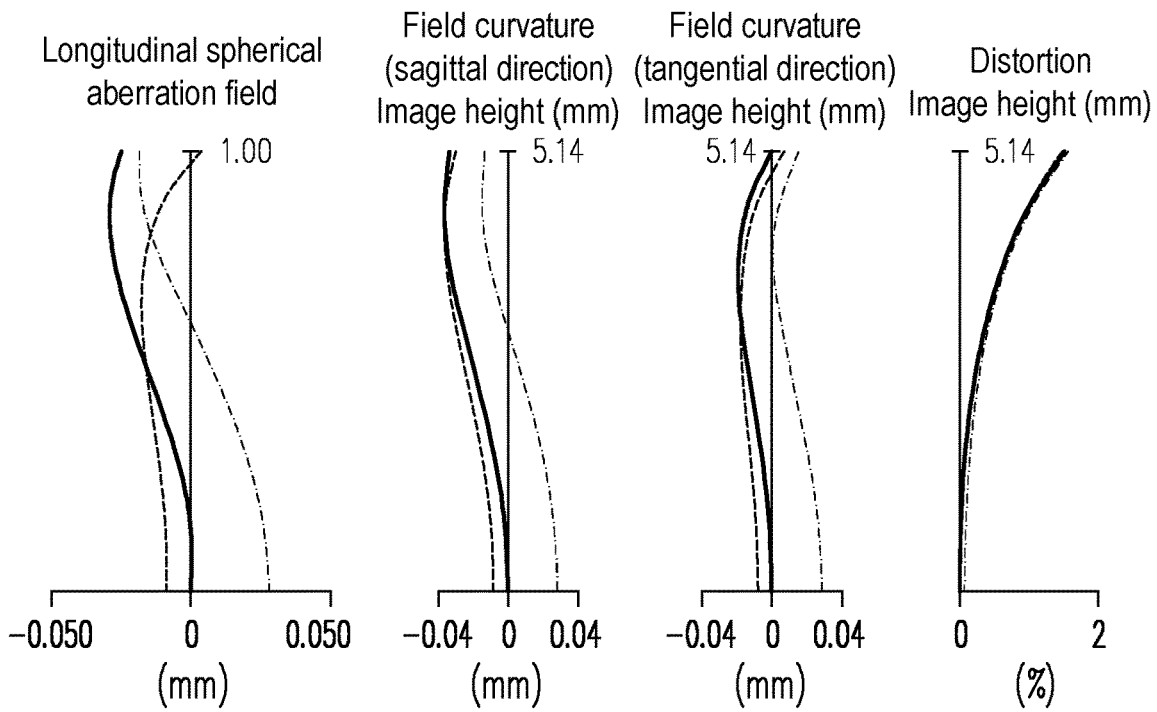
FIG. 7A   FIG. 7B   FIG. 7C   FIG. 7D

| First embodiment |||||||
|---|---|---|---|---|---|---|
| Effective focal length (EFL)=20.520 mm, Half field of view (HFOV)=13.870 degrees, System length (TTL)=35.000 mm, F-number (Fno)=2.000, image height (ImgH)=5.140 mm。 |||||||
| Element | Surface | Radius (mm) | Thickness (mm) | Refractive index | Abbe number | Focal length (mm) |
| Object |  | Infinity | Infinity |  |  |  |
| First lens element 1 | Object-side surface 15 | 18.085 | 1.946 | 1.905 | 37.053 | 30.786 |
|  | Image-side surface 16 | 48.895 | 4.459 |  |  |  |
| Aperture 0 |  | Infinity | 7.065 |  |  |  |
| Second lens element 2 | Object-side surface 25 | -10.419 | 1.178 | 1.997 | 16.484 | -14.748 |
| Third lens element 3 | Object-side surface 35 | 28.130 | 3.842 | 1.620 | 63.405 | 22.563 |
|  | Image-side surface 36 | -11.078 | 0.942 |  |  |  |
| Third lens element 4 | Object-side surface 45 | 29.763 | 3.556 | 1.932 | 18.895 | 15.139 |
|  | Image-side surface 46 | -25.261 | 0.100 |  |  |  |
| Third lens element 5 | Object-side surface 55 | 11.358 | 2.514 | 1.838 | 42.742 | 17.716 |
|  | Image-side surface 56 | 43.403 | 0.816 |  |  |  |
| Third lens element 6 | Object-side surface 65 | -93.864 | 0.804 | 1.727 | 38.021 | -10.269 |
|  | Image-side surface 66 | 8.138 | 3.509 |  |  |  |
| Optical filter 9 | Object-side surface 95 | Infinity | 0.950 | 1.518 | 64.166 |  |
|  | Image-side surface 96 | Infinity | 3.319 |  |  |  |
|  | Image plane 99 | Infinity |  |  |  |  |

FIG. 8

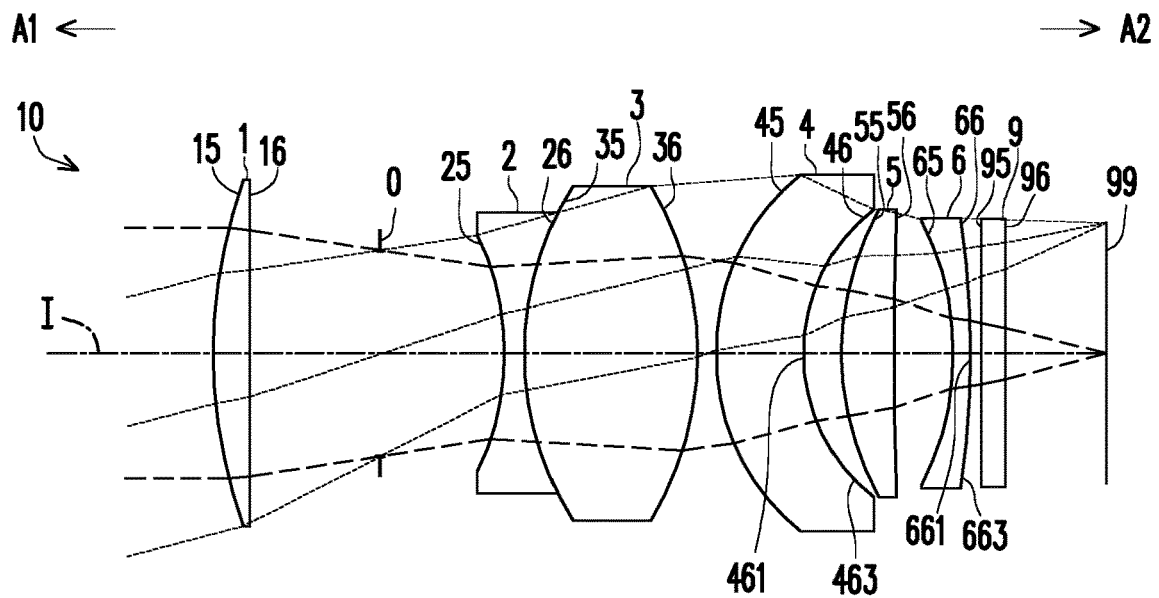
FIG. 9
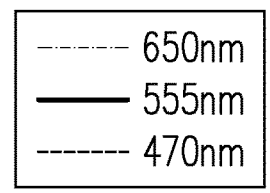
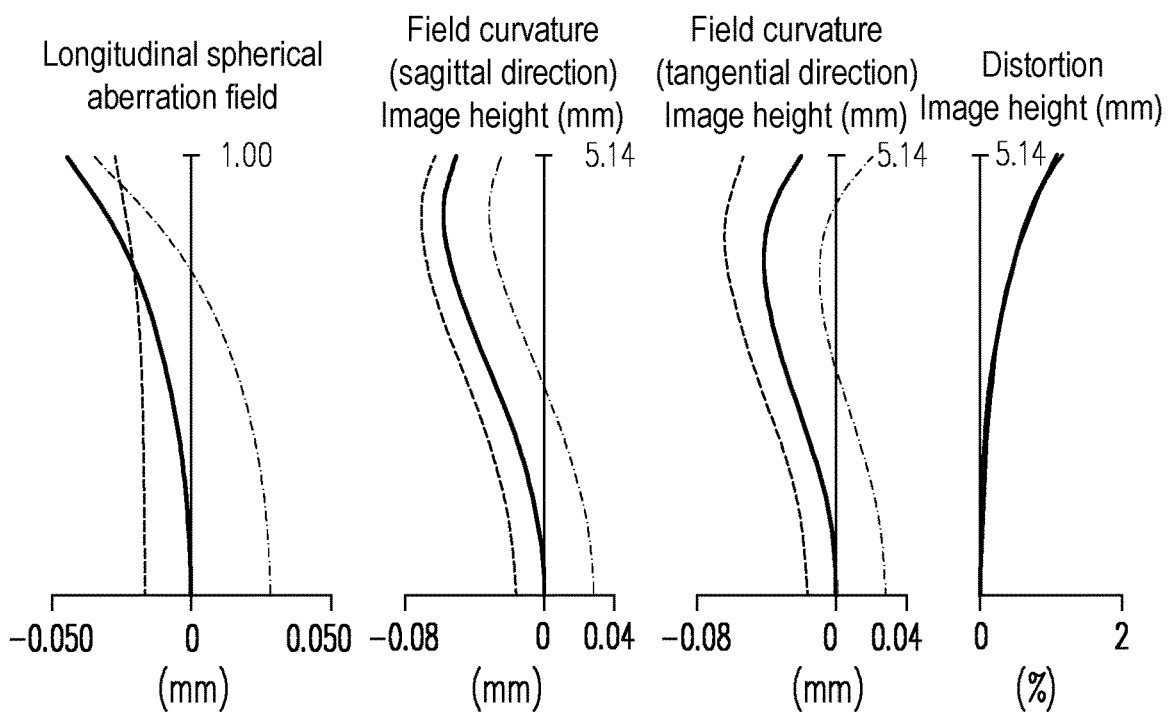
FIG. 10A    FIG. 10B   FIG. 10C   FIG. 10D

| Second embodiment | | | | | | |
|---|---|---|---|---|---|---|
| Effective focal length (EFL)=19.712 mm, Half field of view (HFOV)=14.480 degrees, System length (TTL)=35.100 mm, F-number (Fno)=2.000, Image height (ImgH)=5.140 mm 。 | | | | | | |
| Element | Surface | Radius (mm) | Thickness (mm) | Refractive index | Abbe number | Focal length (mm) |
| Object | | Infinity | Infinity | | | |
| First lens element 1 | Object-side surface 15 | 21.154 | 1.387 | 1.673 | 47.197 | 32.569 |
| | Image-side surface 16 | 599.515 | 5.234 | | | |
| Aperture 0 | | Infinity | 4.779 | | | |
| Second lens element 2 | Object-side surface 25 | -10.419 | 0.800 | 1.758 | 25.047 | -24.609 |
| Third lens element 3 | Object-side surface 35 | 12.278 | 6.800 | 1.747 | 44.903 | 17.255 |
| | Image-side surface 36 | -12.745 | 0.720 | | | |
| Fourth lens element 4 | Object-side surface 45 | 8.991 | 3.460 | 1.931 | 20.880 | -326.269 |
| | Image-side surface 46 | 7.112 | 1.460 | | | |
| Fifth lens element 5 | Object-side surface 55 | 11.413 | 2.107 | 1.747 | 44.903 | 16.234 |
| | Image-side surface 56 | 178.582 | 2.295 | | | |
| Sixth lens element 6 | Object-side surface 65 | -11.791 | 0.709 | 1.651 | 33.842 | -27.563 |
| | Image-side surface 66 | -35.188 | 0.398 | | | |
| Optical filter 9 | Object-side surface 95 | Infinity | 0.950 | 1.518 | 64.166 | |
| | Image-side surface 96 | Infinity | 4.000 | | | |
| | Image plane 99 | Infinity | | | | |

FIG. 11

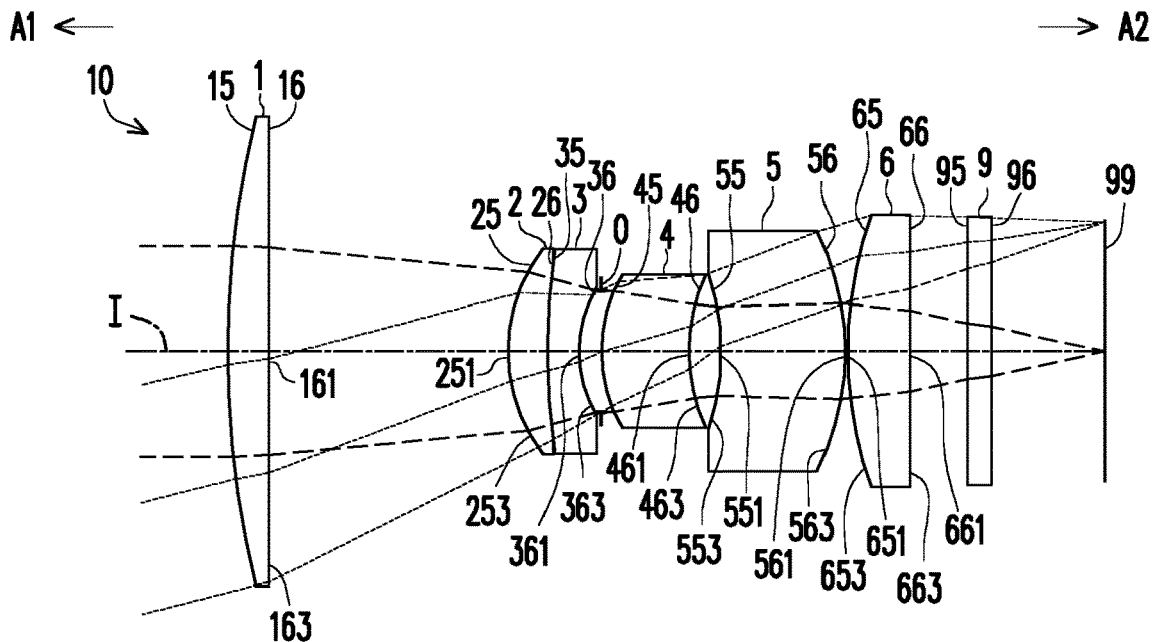
FIG. 12
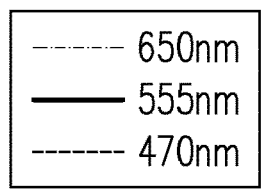
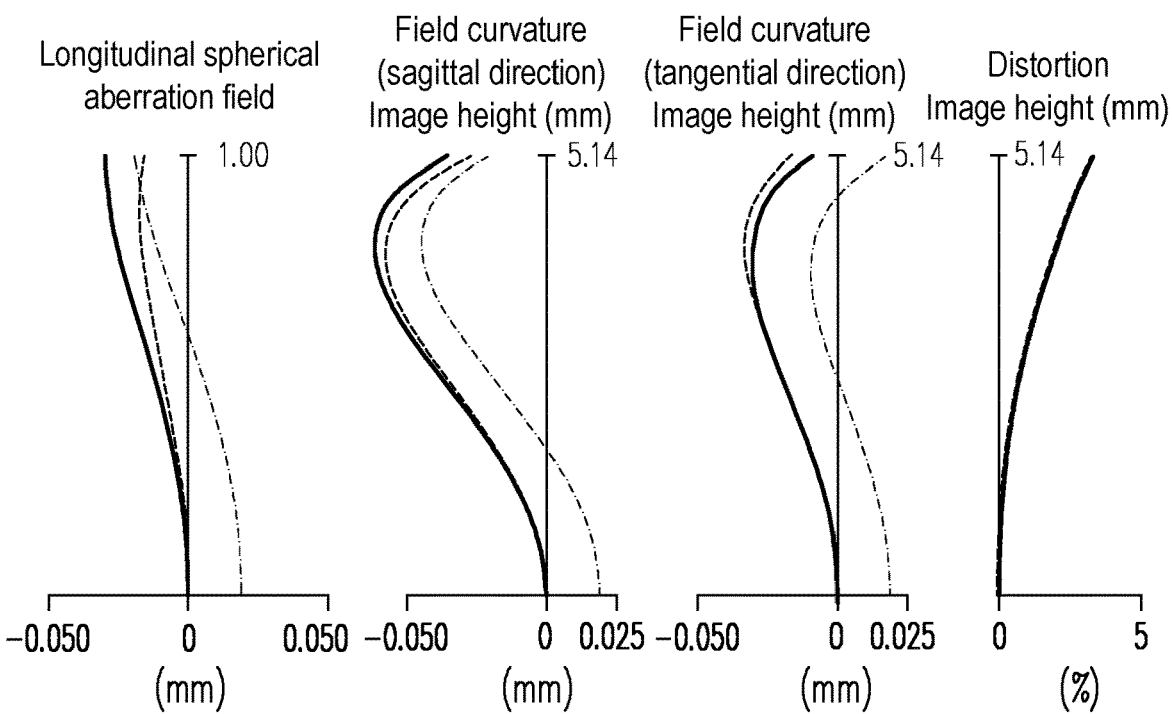
FIG. 13A   FIG. 13B   FIG. 13C   FIG. 13D

| Third embodiment | | | | | | |
|---|---|---|---|---|---|---|
| Effective focal length (EFL)=20.111 mm, Half field of view (HFOV)=13.900 degrees, System length (TTL)=35.100 mm, F-number (Fno)=2.400, Image height (ImgH)=5.140 mm。 | | | | | | |
| Element | Surface | Radius (mm) | Thickness (mm) | Refractive index | Abbe number | Focal length (mm) |
| Object | | Infinity | Infinity | | | |
| First lens element 1 | Object-side surface 15 | 38.683 | 1.643 | 1.855 | 30.060 | 45.231 |
| | Image-side surface 16 | Infinity | 9.600 | | | |
| Second lens element 2 | Object-side surface 25 | 6.629 | 1.541 | 1.747 | 44.903 | 15.799 |
| Third lens element 3 | Object-side surface 35 | 28.130 | 1.247 | 1.814 | 22.764 | -6.026 |
| | Image-side surface 36 | 4.830 | 0.909 | | | |
| Aperture 0 | | Infinity | 0.028 | | | |
| Fourth lens element 4 | Object-side surface 45 | 6.038 | 3.484 | 1.518 | 64.211 | 37.221 |
| | Image-side surface 46 | 7.057 | 1.263 | | | |
| Fifth lens element 5 | Object-side surface 55 | -10.010 | 4.990 | 1.905 | 37.120 | 87.965 |
| | Image-side surface 56 | -10.998 | 0.100 | | | |
| Sixth lens element 6 | Object-side surface 65 | 15.936 | 2.494 | 1.860 | 36.597 | 18.537 |
| | Image-side surface 66 | Infinity | 2.283 | | | |
| Optical filter 9 | Object-side surface 95 | Infinity | 0.950 | 1.518 | 64.166 | |
| | Image-side surface 96 | Infinity | 4.567 | | | |
| | Image plane 99 | Infinity | | | | |

FIG. 14

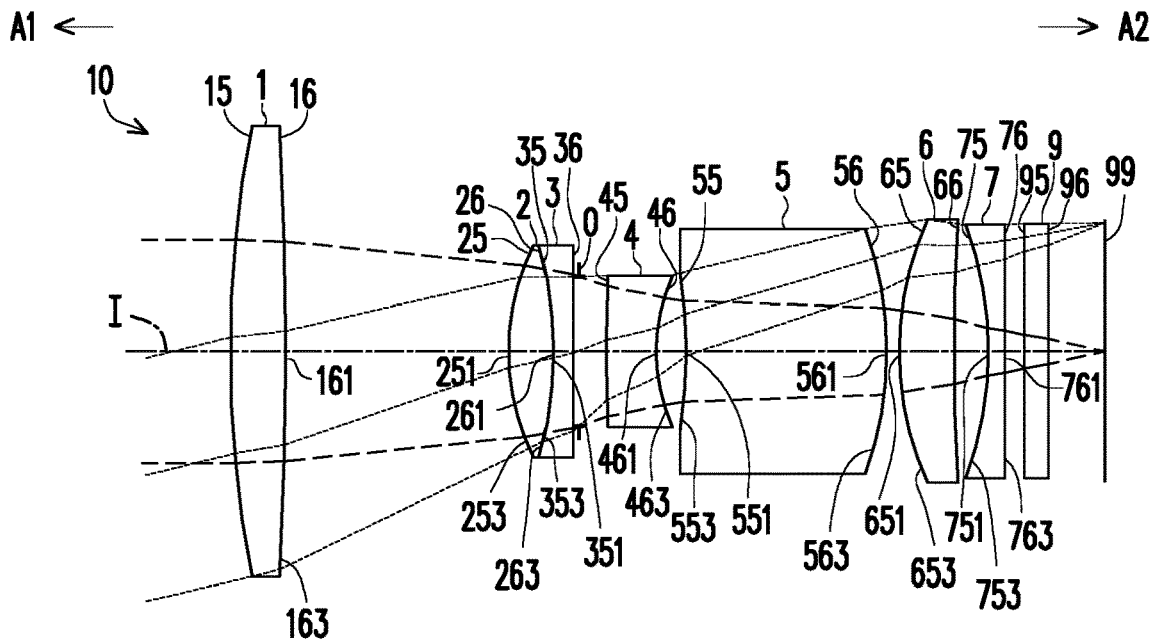
FIG. 15
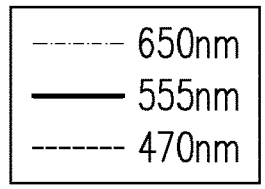
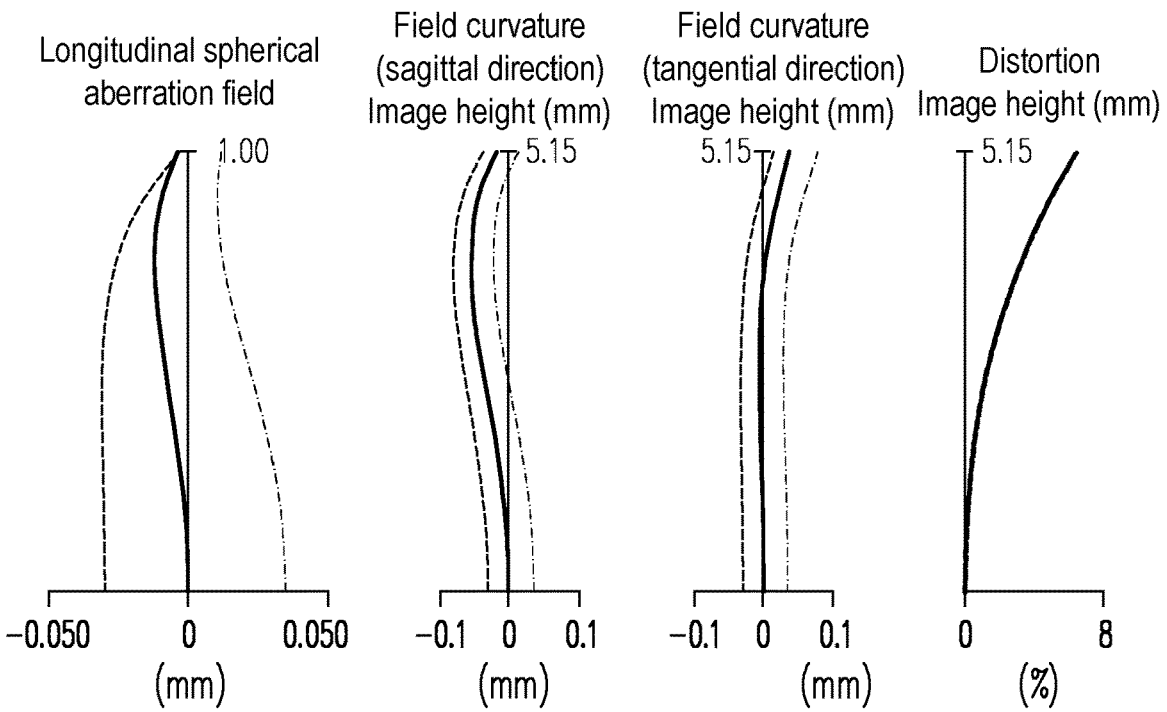
FIG. 16A   FIG. 16B   FIG. 16C   FIG. 16D

| Fourth embodiment | | | | | | |
|---|---|---|---|---|---|---|
| Effective focal length (EFL)=20.050 mm, Half field of view (HFOV)=13.55 degrees, System length (TTL)=35.100 mm, F-number (Fno)=2.250, Image height (ImgH)=5.150 mm。 | | | | | | |
| Element | Surface | Radius (mm) | Thickness (mm) | Refractive index | Abbe number | Focal length (mm) |
| Object | | Infinity | Infinity | | | |
| First lens element 1 | Object-side surface 15 | 48.114 | 2.172 | 1.838 | 42.721 | 45.142 |
| | Image-side surface 16 | -173.667 | 9.000 | | | |
| Second lens element 2 | Object-side surface 25 | 9.395 | 1.779 | 1.641 | 55.471 | 30.250 |
| Third lens element 3 | Object-side surface 35 | -15.370 | 0.800 | 1.790 | 25.719 | -109.832 |
| | Image-side surface 36 | -1266.921 | 0.196 | | | |
| Aperture 0 | | Infinity | 1.135 | | | |
| Fourth lens element 4 | Object-side surface 45 | 69.174 | 2.012 | 1.606 | 38.008 | -13.630 |
| | Image-side surface 46 | 7.301 | 1.198 | | | |
| Fifth lens element 5 | Object-side surface 55 | -19.807 | 8.047 | 1.838 | 42.721 | 38.836 |
| | Image-side surface 56 | -14.597 | 0.500 | | | |
| Sixth lens element 6 | Object-side surface 65 | 12.659 | 2.217 | 1.838 | 42.742 | 17.673 |
| | Image-side surface 66 | 80.001 | 1.369 | | | |
| Seventh lens element 7 | Object-side surface 75 | -14.480 | 0.676 | 1.534 | 48.851 | -27.131 |
| | Image-side surface 76 | Infinity | 0.800 | | | |
| Optical filter 9 | Object-side surface 95 | Infinity | 0.950 | 1.518 | 64.166 | |
| | Image-side surface 96 | Infinity | 2.250 | | | |
| | Image plane 99 | Infinity | | | | |

FIG. 17

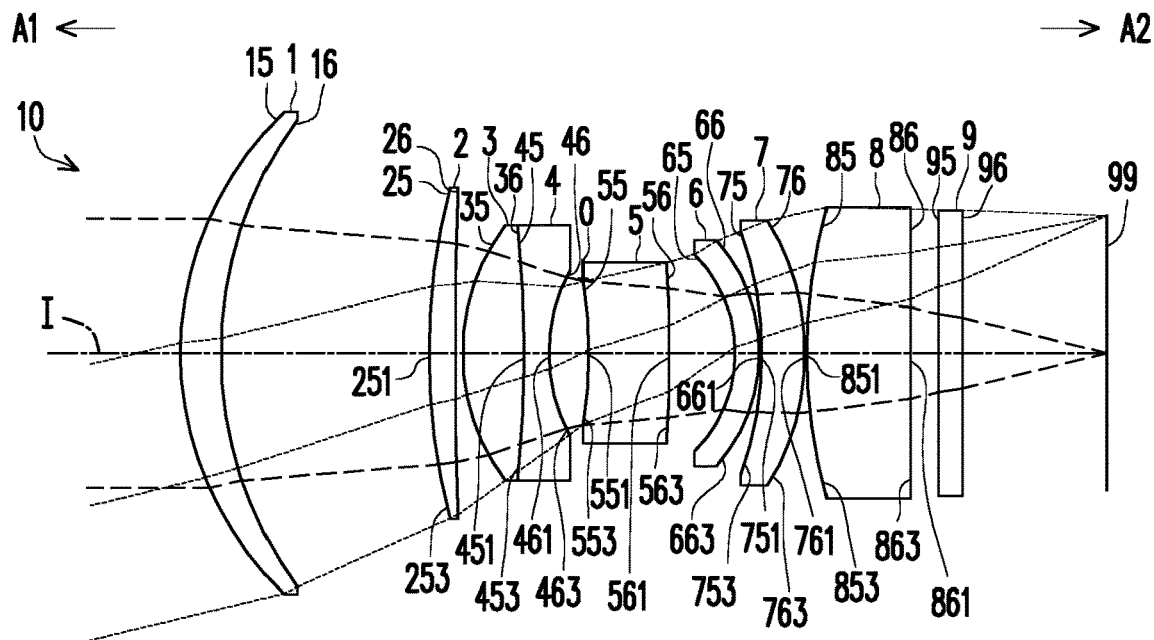
FIG. 18
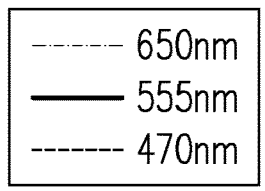
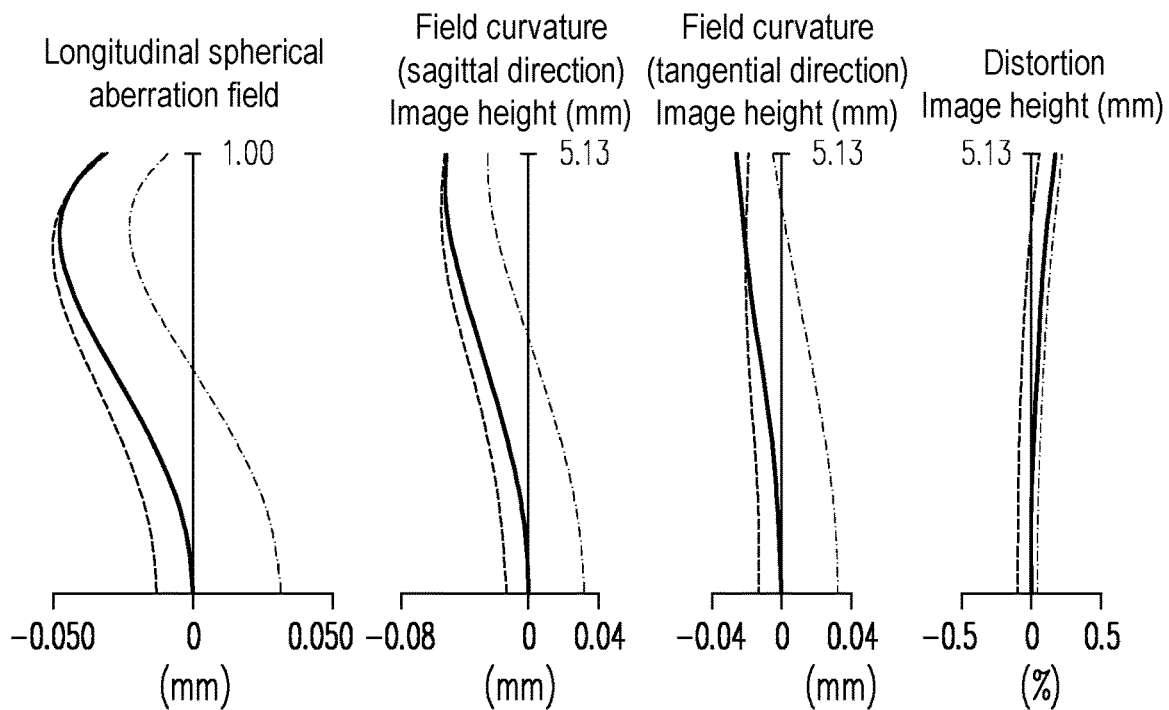
FIG. 19A  FIG. 19B  FIG. 19C  FIG. 19D

| Fifth embodiment | | | | | | |
|---|---|---|---|---|---|---|
| Effective focal length (EFL)=21.631 mm, Half field of view (HFOV)=13.37 degrees, Half field of view (HFOV)=13.37 degrees, F-number (Fno)=2.150, Image height (ImgH)=5.130 mm。 | | | | | | |
| Element | Surface | Radius (mm) | Thickness (mm) | Refractive index | Abbe number | Focal length (mm) |
| Object | | Infinity | Infinity | | | |
| First lens element 1 | Object-side surface 15 | 12.339 | 1.551 | 1.855 | 40.104 | 67.813 |
| | Image-side surface 16 | 14.765 | 7.848 | | | |
| Second lens element 2 | Object-side surface 25 | 24.544 | 0.981 | 1.855 | 30.060 | 33.345 |
| | Image-side surface 26 | 172.898 | 0.300 | | | |
| Third lens element 3 | Object-side surface 35 | 7.877 | 2.322 | 1.747 | 44.903 | 19.410 |
| Fourth lens element 4 | Object-side surface 45 | -43.445 | 0.900 | 1.814 | 22.764 | -7.801 |
| | Image-side surface 46 | 6.437 | 1.283 | | | |
| Aperture 0 | | Infinity | 0.223 | | | |
| Fifth lens element 5 | Object-side surface 55 | -17.201 | 3.049 | 1.518 | 64.211 | -47.373 |
| | Image-side surface 56 | -60.930 | 2.513 | | | |
| Sixth lens element 6 | Object-side surface 65 | -5.160 | 0.900 | 1.905 | 37.053 | -47.617 |
| | Image-side surface 66 | -6.348 | 0.100 | | | |
| Seventh lens element 7 | Object-side surface 75 | -13.048 | 1.604 | 1.838 | 42.742 | 35.919 |
| | Image-side surface 76 | -9.614 | 0.100 | | | |
| Eighth lens element 8 | Object-side surface 85 | 20.354 | 3.923 | 1.860 | 36.597 | 23.676 |
| | Image-side surface 86 | Infinity | 1.023 | | | |
| Optical filter 9 | Object-side surface 95 | Infinity | 0.941 | 1.518 | 64.166 | |
| | Image-side surface 96 | Infinity | 5.441 | | | |
| | Image plane 99 | Infinity | | | | |

FIG. 20

| Condition | First embodiment | Second embodiment | Third embodiment | Fourth embodiment | Fifth embodiment |
|---|---|---|---|---|---|
| T1 | 1.946 | 1.387 | 1.643 | 2.172 | 1.551 |
| G12 | 11.524 | 10.013 | 9.600 | 9.000 | 7.848 |
| T2 | 1.178 | 0.800 | 1.541 | 1.779 | 0.981 |
| G23 | 0.000 | 0.000 | 0.000 | 0.000 | 0.300 |
| T3 | 3.842 | 6.800 | 1.248 | 0.800 | 2.322 |
| G34 | 0.942 | 0.721 | 0.937 | 1.331 | 0.000 |
| T4 | 3.556 | 3.460 | 3.484 | 2.012 | 0.900 |
| G45 | 0.100 | 1.460 | 1.263 | 1.198 | 1.506 |
| T5 | 2.514 | 2.107 | 4.990 | 8.047 | 3.049 |
| G56 | 0.817 | 2.295 | 0.100 | 0.500 | 2.513 |
| T6 | 0.804 | 0.709 | 2.494 | 2.217 | 0.900 |
| G67 | | | | 1.369 | 0.100 |
| T7 | | | | 0.676 | 1.604 |
| G78 | | | | | 0.100 |
| T8 | | | | | 3.923 |
| GFF | 3.509 | 0.398 | 2.283 | 0.800 | 1.023 |
| TF | 0.950 | 0.950 | 0.950 | 0.950 | 0.941 |
| GFP | 3.319 | 4.000 | 4.567 | 2.250 | 5.441 |
| EFL | 20.520 | 19.712 | 20.111 | 20.050 | 21.631 |
| TL | 27.222 | 29.752 | 27.300 | 31.100 | 27.595 |
| BFL | 7.778 | 5.348 | 7.800 | 4.000 | 7.405 |
| ALT | 13.840 | 15.264 | 15.400 | 17.702 | 15.229 |
| AAG | 13.383 | 14.488 | 11.900 | 13.398 | 12.366 |
| TTL | 35.000 | 35.100 | 35.100 | 35.100 | 35.000 |
| HFOV | 13.870 | 14.480 | 13.900 | 13.550 | 13.370 |
| ImgH | 5.140 | 5.140 | 5.140 | 5.150 | 5.130 |
| Fno | 2.000 | 2.000 | 2.400 | 2.250 | 2.150 |
| Gallmax | 11.524 | 10.013 | 9.600 | 9.000 | 7.848 |
| Tmax | 3.842 | 6.800 | 4.990 | 8.047 | 3.923 |
| Tmin | 0.804 | 0.709 | 1.248 | 0.676 | 0.900 |
| Tavg | 2.307 | 2.544 | 2.567 | 2.529 | 1.904 |

FIG. 21

| Condition | First embodiment | Second embodiment | Third embodiment | Fourth embodiment | Fifth embodiment |
|---|---|---|---|---|---|
| Gallmax/Fno | 5.762 | 5.007 | 4.000 | 4.000 | 3.650 |
| EFL/ImgH | 3.992 | 3.835 | 3.913 | 3.893 | 4.217 |
| Gallmax/Tavg | 4.996 | 3.936 | 3.740 | 3.559 | 4.122 |
| EFL/Gallmax | 1.781 | 1.969 | 2.095 | 2.228 | 2.756 |
| EFL/HFOV | 1.479 | 1.361 | 1.447 | 1.480 | 1.618 |
| TTL/BFL | 4.500 | 6.563 | 4.500 | 8.775 | 4.727 |
| (EFL+BFL)/Gallmax | 2.456 | 2.503 | 2.907 | 2.672 | 3.700 |
| TTL/(Tmax+Tmin) | 7.533 | 4.674 | 5.627 | 4.024 | 7.258 |
| (EFL+BFL)/Fno | 14.149 | 12.530 | 11.630 | 10.689 | 13.505 |
| AAG/Tavg | 5.802 | 5.695 | 4.636 | 5.298 | 6.496 |
| Gallmax/Tmax | 3.000 | 1.472 | 1.924 | 1.118 | 2.001 |
| Tmax/Tmin | 4.776 | 9.593 | 4.000 | 11.902 | 4.358 |
| ALT/(G34+G45) | 13.281 | 7.000 | 7.000 | 7.000 | 10.114 |
| (T1+G12)/(T2+G23+T3) | 2.683 | 1.500 | 4.032 | 4.332 | 2.609 |
| AAG/Tmin | 16.637 | 20.437 | 9.539 | 19.816 | 13.740 |
| TL/Tmax | 7.086 | 4.375 | 5.471 | 3.865 | 7.035 |
| ALT/(T1+G12+T2) | 0.945 | 1.251 | 1.205 | 1.367 | 1.467 |
| (T4+T5)/(T2+T6) | 3.062 | 3.690 | 2.100 | 2.517 | 2.100 |
| TL/(G34+G56) | 15.480 | 9.868 | 26.328 | 16.989 | 10.983 |
| AAG/(G12+G34) | 1.074 | 1.350 | 1.129 | 1.297 | 1.576 |
| TL/(G12+G56) | 2.206 | 2.417 | 2.814 | 3.274 | 2.664 |
| (T4+G45+T5)/(T1+T6) | 2.244 | 3.352 | 2.353 | 2.565 | 2.226 |

FIG. 22

OPTICAL IMAGING LENS

CROSS-REFERENCE TO RELATED APPLICATION

This application claims the priority benefit of China application serial no. 202010440277.1, filed on May 22, 2020. The entirety of the above-mentioned patent application is hereby incorporated by reference herein and made a part of this specification.

BACKGROUND

Technical Field

The disclosure relates to an optical element, and more particularly, to an optical imaging lens.

Description of Related Art

Rapid changes to the specifications of portable electronic products lead to diverse development of key components of the portable electronic products, including an optical imaging lens. The application field of automobile lenses has been continuously expanded, such as reversing display, 360-degree panorama, lane departure warning systems, advanced driving assistance systems (ADAS), and so on.

The automobile lenses are required to overcome various weather challenges, and thus lens elements of the lenses are usually made of scraping-resistant and corrosion-resistant glass materials with sufficient strength to pass environmental tests. In addition, there is also a telephoto camera shooting requirement for the automobile lenses, and the automobile lenses can perform an optical zooming function in cooperation with wide-angle lenses; if an effective focal length of a telephoto lens becomes longer, the higher-power zooming effect may be accomplished.

Therefore, an automobile lens that can overcome various weather challenges, has a long effective focal length, is low in cost, and complies with the demand for imaging quality requires researches and studies by many parties.

SUMMARY

The disclosure provides an optical imaging lens that may overcome various weather challenges, has a long effective focal length, is low in cost, and complies with a demand for imaging quality.

An embodiment of the disclosure provides an optical imaging lens including a first lens element, a second lens element, a third lens element, a fourth lens element, a fifth lens element, and a sixth lens element sequentially along an optical axis from an object side to an image side. Each of the first lens element to the sixth lens element includes an object-side surface facing the object side and allowing imaging rays to pass through and an image-side surface facing the image side and allowing the imaging rays to pass through. The first lens element is arranged to be a lens element in a first order from the object side to the image side, and the first lens element has a positive refracting power. The second lens element is arranged to be a lens element in a second order from the object side to the image side. The third lens element is arranged to be a lens element in a third order from the object side to the image side. The fourth lens element is arranged to be a lens element in a fourth order from the object side to the image side. The fifth lens element is arranged to be a lens element in a fifth order from the object side to the image side. The sixth lens element is arranged to be a lens element in a sixth order from the object side to the image side. The optical imaging lens satisfies conditions of Gallmax/Fno≥3.600 millimeters, EFL/ImgH≥3.200, and Gallmax/Tavg≥3.300, wherein Gallmax represents a largest air gap along the optical axis between the first lens element and an image plane, Fno represents an F-number of the optical imaging lens, EFL represents an effective focal length of the optical imaging lens, ImgH represents an image height of the optical imaging lens, and Tavg represents an average lens element thickness of all of the lens elements along the optical axis from the object side to the image plane.

An embodiment of the disclosure provides an optical imaging lens including a first lens element, a second lens element, a third lens element, a fourth lens element, a fifth lens element, and a sixth lens element sequentially along an optical axis from an object side to an image side. Each of the first lens element to the sixth lens element includes an object-side surface facing the object side and allowing imaging rays to pass through and an image-side surface facing the image side and allowing the imaging rays to pass through. The first lens element is arranged to be a lens element in a first order from the object side to the image side. The second lens element is arranged to be a lens element in a second order from the object side to the image side. The third lens element is arranged to be a lens element in a third order from the object side to the image side. The fourth lens element is arranged to be a lens element in a fourth order from the object side to the image side. The fifth lens element is arranged to be a lens element in a fifth order from the object side to the image side. The sixth lens element is arranged to be a lens element in a sixth order from the object side to the image side. The optical imaging lens satisfies conditions of Gallmax/Fno≥3.600 millimeters, EFL/ImgH≥3.200, and EFL/Gallmax≤4.000, wherein Gallmax represents a largest air gap along the optical axis between the first lens element and an image plane, Fno represents an F-number of the optical imaging lens, EFL represents an effective focal length of the optical imaging lens, and ImgH represents an image height of the optical imaging lens.

An embodiment of the disclosure provides an optical imaging lens including a first lens element, a second lens element, a third lens element, a fourth lens element, a fifth lens element, and a sixth lens element sequentially along an optical axis from an object side to an image side. Each of the first lens element to the sixth lens element includes an object-side surface facing the object side and allowing imaging rays to pass through and an image-side surface facing the image side and allowing the imaging rays to pass through. The first lens element is arranged to be a lens element in a first order from the object side to the image side. The second lens element is arranged to be a lens element in a second order from the object side to the image side. The third lens element is arranged to be a lens element in a third order from the object side to the image side. The fourth lens element is arranged to be a lens element in a fourth order from the object side to the image side. The fifth lens element is arranged to be a lens element in a fifth order from the object side to the image side. The sixth lens element is arranged to be a lens element in a sixth order from the object side to the image side. The optical imaging lens satisfies conditions of Gallmax/Fno≥3.600 millimeters, EFL/ImgH≥2.200, EFL/HFOV≤3.000 millimeters/degree, and TTL/BFL≥4.500, wherein Gallmax represents a largest air gap along the optical axis between the first lens element and an image plane, Fno represents an F-number of the optical imaging lens, EFL represents an effective focal length of the optical imaging lens, ImgH represents an image height of the optical imaging lens, HFOV represents a half field of view of the optical imaging lens, TTL represents a distance along the optical axis from the object-side surface of the first lens element to the image plane, and BFL represents a distance along the optical axis from an image-side surface of a last lens element counted from the object side to the image side to the image plane.

In light of the above, the optical imaging lens provided in one or more embodiments of the disclosure may achieve the following effects: the optical imaging lens may overcome various weather challenges, provide the long effective focal length and the low cost, and comply with the demand for the imaging quality, given that the requirement for concave-convex surface arrangement, the requirement for a refracting power of the lens elements, and the aforesaid conditions may be satisfied.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and together with the description serve to explain the principles of the disclosure.

FIG. 6 is a schematic diagram of an optical imaging lens according to a first embodiment of the disclosure.

FIG. 7A to FIG. 7D illustrate a longitudinal spherical aberration and various aberrations of the optical imaging lens according to the first embodiment.

FIG. 8 shows detailed optical data of the optical imaging lens according to the first embodiment of the disclosure.

FIG. 9 is a schematic diagram of an optical imaging lens according to a second embodiment of the disclosure.

FIG. 10A to FIG. 10D illustrate a longitudinal spherical aberration and various aberrations of the optical imaging lens according to the second embodiment.

FIG. 11 shows detailed optical data of the optical imaging lens according to the second embodiment of the disclosure.

FIG. 12 is a schematic diagram of an optical imaging lens according to a third embodiment of the disclosure.

FIG. 13A to FIG. 13D illustrate a longitudinal spherical aberration and various aberrations of the optical imaging lens according to the third embodiment.

FIG. 14 shows detailed optical data of the optical imaging lens according to the third embodiment of the disclosure.

FIG. 15 is a schematic diagram of an optical imaging lens according to a fourth embodiment of the disclosure.

FIG. 16A to FIG. 16D illustrate a longitudinal spherical aberration and various aberrations of the optical imaging lens according to the fourth embodiment.

FIG. 17 shows detailed optical data of the optical imaging lens according to the fourth embodiment of the disclosure.

FIG. 18 is a schematic diagram of an optical imaging lens according to a fifth embodiment of the disclosure.

FIG. 19A to FIG. 19D illustrate a longitudinal spherical aberration and various aberrations of the optical imaging lens according to the fifth embodiment.

FIG. 20 shows detailed optical data of the optical imaging lens according to the fifth embodiment of the disclosure.

FIG. 21 and FIG. 22 show various important parameters and numeric values of relations of the parameters of the optical imaging lens according to the first to the fifth embodiment of the disclosure.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
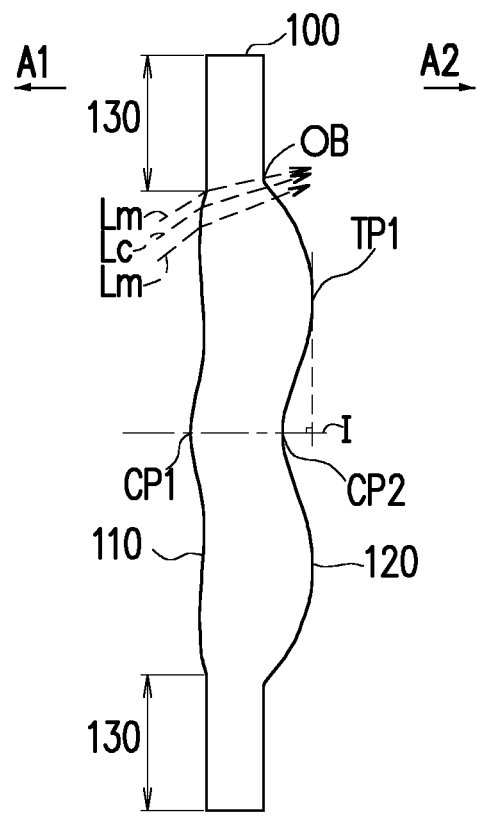
FIG. 1 is a radial cross-sectional view of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
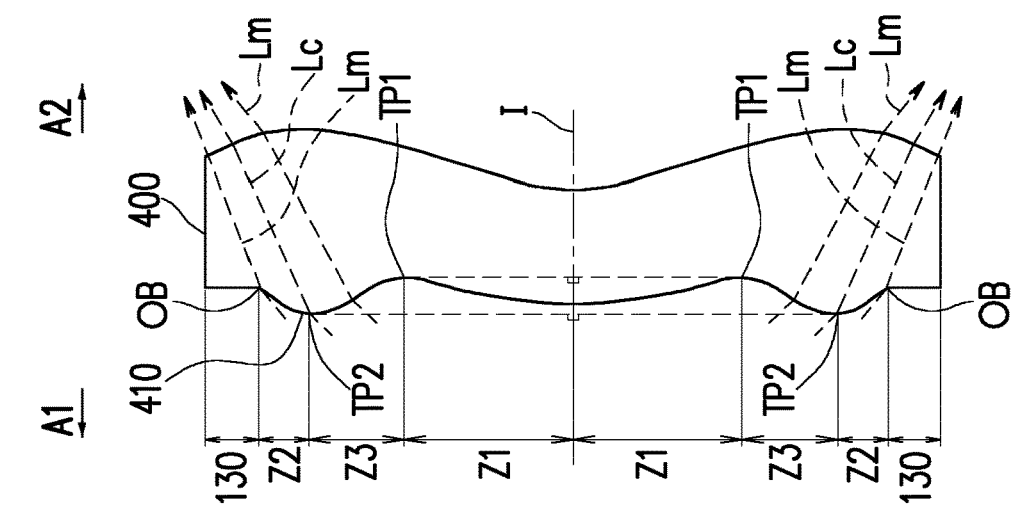
FIG. 4 is a radial cross-sectional view of a lens element.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
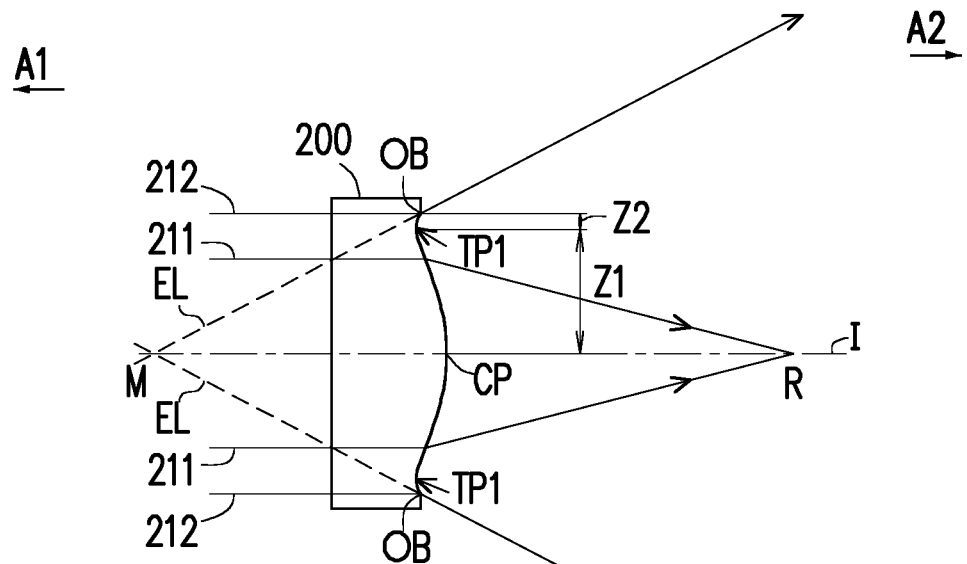
FIG. 2 is a schematic diagram illustrating a surface shape concave-convex structure and a light ray focal point of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
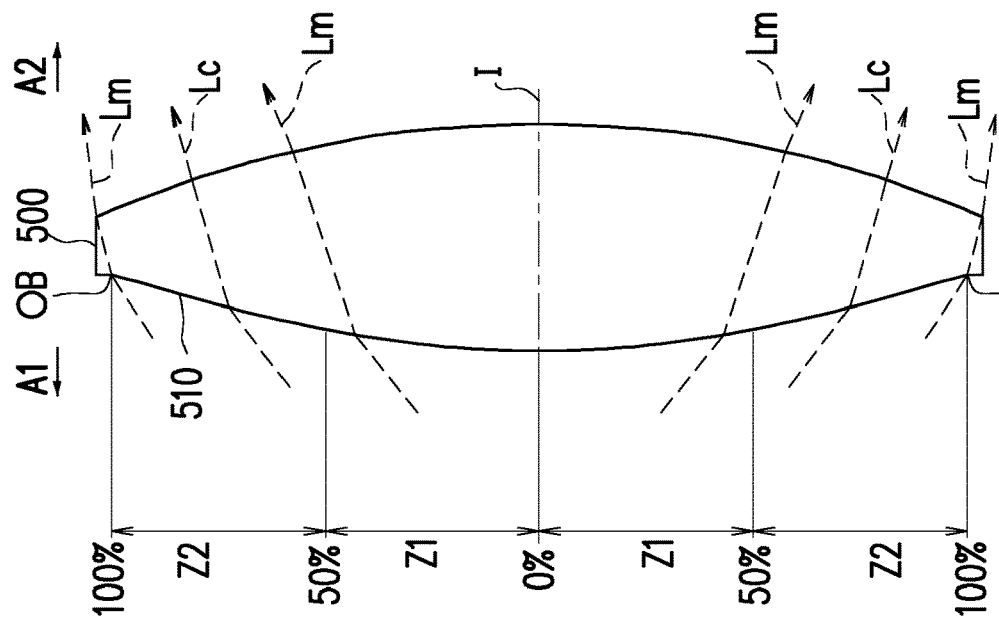
FIG. 5 is a radial cross-sectional view of a lens element.
Figure 3:
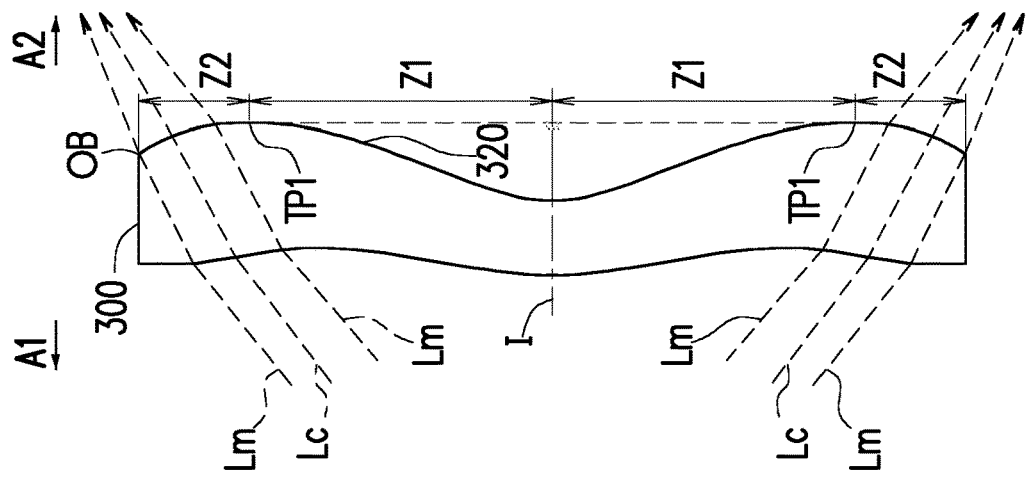
FIG. 3 is a radial cross-sectional view of a lens element.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2. FIG. 6 is a schematic diagram of an optical imaging lens according to a first embodiment of the disclosure. FIG. 7A to FIG. 7D illustrate a longitudinal spherical aberration and various aberrations of the optical imaging lens according to the first embodiment. Referring to FIG. 6 first, the optical imaging lens 10 according to the first embodiment of the disclosure includes a first lens element 1, an aperture 0, a second lens element 2, a third lens element 3, a fourth lens element 4, a fifth lens element 5, a sixth lens element 6, and an optical filter 9 sequentially along an optical axis I of the optical imaging lens 10 from an object side A1 to an image side A2. An image will be formed on an image plane 99 after a light ray emitted from an object to be shot enters the optical imaging lens 10 and passes through the first lens element 1, the aperture 0, the second lens element 2, the third lens element 3, the fourth lens element 4, the fifth lens element 5, the sixth lens element 6 and the optical filter 9. The optical filter 9 is disposed between an image-side surface 66 of the sixth lens element 6 and the image plane 99. It should also be noted that the object side is a side facing the object to be shot, and the image side is a side facing the image plane 99. In one embodiment, the optical filter 9 may be an IR cut filter, but the disclosure is not limited to this.

In the present embodiment, the first lens element 1, the second lens element 2, the third lens element 3, the fourth lens element 4, the fifth lens element 5, the sixth lens element 6 and the optical filter 9 of the optical imaging lens 10 respectively have object-side surfaces 15, 25, 35, 45, 55, 65 and 95 facing the object side and allowing imaging rays to pass through and image-side surfaces 16, 26, 36, 46, 56, 66 and 96 facing the image side and allowing the imaging rays to pass through. In the present embodiment, the aperture 0 is disposed between the first lens element 1 and the second lens element 2.

The first lens element 1 has a positive refracting power. The material of the first lens element 1 is glass. An optical axis region 151 of the object-side surface 15 of the first lens element 1 is convex, and a periphery region 153 thereof is convex. An optical axis region 161 of the image-side surface 16 of the first lens element 1 is concave, and a periphery region 163 thereof is concave. In the present embodiment, the object-side surface 15 and the image-side surface 16 of the first lens element 1 are both spherical surfaces, but the disclosure is not limited to this.

The second lens element 2 has a negative refracting power. The material of the second lens element 2 glass. An optical axis region 251 of the object-side surface 25 of the second lens element 2 is concave, and a periphery region 253 thereof is concave. An optical axis region 261 of the image-side surface 26 of the second lens element 2 is concave, and a periphery region 263 thereof is concave. In the present embodiment, the object-side surface 25 and the image-side surface 26 of the second lens element 2 are both spherical surfaces, but the disclosure is not limited to this.

The third lens element 3 has a positive refracting power. The material of the third lens element 3 is glass. An optical axis region 351 of the object-side surface 35 of the third lens element 3 is convex, and a periphery region 353 thereof is convex. An optical axis region 361 of the image-side surface 36 of the third lens element 3 is convex, and a periphery region 363 thereof is convex. In the present embodiment, the object-side surface 35 and the image-side surface 36 of the third lens element 3 are both spherical surfaces, but the disclosure is not limited to this.

In addition, in one embodiment, the second lens element 2 and the third lens element 3 may be cemented lens elements.

The fourth lens element 4 has a positive refracting power. The material of the fourth lens element 4 is glass. An optical axis region 451 of the object-side surface 45 of the fourth lens element 4 is convex, and a periphery region 453 thereof is convex. An optical axis region 461 of the image-side surface 46 of the fourth lens element 4 is convex, and a periphery region 463 thereof is convex. In the present embodiment, the object-side surface 45 and the image-side surface 46 of the fourth lens element 4 are both spherical surfaces, but the disclosure is not limited to this.

The fifth lens element 5 has a positive refracting power. The material of the fifth lens element 5 is glass. An optical axis region 551 of the object-side surface 55 of the fifth lens element 5 is convex, and a periphery region 553 thereof is convex. An optical axis region 561 of the image-side surface 56 of the fifth lens element 5 is concave, and a periphery region 563 thereof is concave. In the present embodiment, the object-side surface 55 and the image-side surface 56 of the fifth lens element 5 are both spherical surfaces, but the disclosure is not limited to this.

The sixth lens element 6 has a negative refracting power. The material of the sixth lens element 6 is glass. An optical axis region 651 of the object-side surface 65 of the sixth lens element 6 is concave, and a periphery region 653 thereof is concave. An optical axis region 661 of the image-side surface 66 of the sixth lens element 6 is concave, and a periphery region 663 thereof is concave. In the present embodiment, the object-side surface 65 and the image-side surface 66 of the sixth lens element 6 are both spherical surfaces, but the disclosure is not limited to this.

Other detailed optical data of the first embodiment are shown in FIG. 8. In the optical imaging lens 10 according to the first embodiment, an effective focal length (EFL) is 20.520 millimeters (mm), a half field of view (HFOV) is 13.870 degrees, an F-number (Fno) is 2.000, a system length of the optical imaging lens is 35.000 millimeters, and an image height is 5.140 millimeters. The system length refers to a distance along the optical axis I from the object-side surface 15 of the first lens element 1 to the image plane 99.

In addition, relations between various important parameters of the optical imaging lens 10 according to the first embodiment are as shown in FIGS. 21 and 22.

Wherein,

T1 represents a thickness of the first lens element 1 along the optical axis I.

T2 represents a thickness of the second lens element 2 along the optical axis I.

T3 represents a thickness of the third lens element 3 along the optical axis I.

T4 represents a thickness of the fourth lens element 4 along the optical axis I.

T5 represents a thickness of the fifth lens element 5 along the optical axis I.

T6 represents a thickness of the sixth lens element 6 along the optical axis I.

T7 represents a thickness of a seventh lens element 7 (e.g., the seventh lens element 7 in FIGS. 15 and 18) along the optical axis I.

T8 represents a thickness of an eighth lens element 8 (e.g., the eighth lens element 8 in FIG. 18) along the optical axis I.

G12 represents a distance along the optical axis I from the image-side surface 16 of the first lens element 1 to the object-side surface 25 of the second lens element 2, namely an air gap along the optical axis I between the first lens element 1 and the second lens element 2.

G23 represents a distance along the optical axis I from the image-side surface 26 of the second lens element 2 to the object-side surface 35 of the third lens element 3, namely an air gap along the optical axis I between the second lens element 2 and the third lens element 3.

G34 represents a distance along the optical axis I from the image-side surface 36 of the third lens element 3 to the object-side surface 45 of the fourth lens element 4, namely an air gap along the optical axis I between the third lens element 3 and the fourth lens element 4.

G45 represents a distance along the optical axis I from the image-side surface 46 of the fourth lens element 4 to the object-side surface 55 of the fifth lens element 5, namely an air gap along the optical axis I between the fourth lens element 4 and the fifth lens element 5.

G56 represents a distance along the optical axis I from the image-side surface 56 of the fifth lens element 5 to the object-side surface 65 of the sixth lens element 6, namely an air gap along the optical axis I between the fifth lens element 5 and the sixth lens element 6.

G67 represents a distance along the optical axis I from the image-side surface 66 of the sixth lens element 6 to an object-side surface 75 of the seventh lens element 7, namely an air gap along the optical axis I between the sixth lens element 6 and the seventh lens element 7.

G78 represents a distance along the optical axis I from an image-side surface 76 of the seventh lens element 7 to an object-side surface 85 of the eighth lens element 8, namely an air gap along the optical axis I between the seventh lens element 7 and the eighth lens element 8.

AAG represents a sum of air gaps along the optical axis I from the first lens element 1 to the last lens element counted from the object side A1 to the image side A2 (i.e., a sum of the air gaps G12, G23, G34, G45, and G56 in the first embodiment).

ALT represents a sum of all of the lens element thicknesses along the optical axis I (i.e., a sum of the thicknesses T1, T2, T3, T4, T5, and T6 in the first embodiment).

TL represents a distance along the optical axis I from the object-side surface 15 of the first lens element 1 to an image-side surface of the last lens element counted from the object side A1 to the image side A2 (i.e., a distance along the optical axis I from the object-side surface 15 of the first lens element 1 to the image-side surface 66 of the sixth lens element 6 in the first embodiment).

TTL represents a distance along the optical axis I from the object-side surface 15 of the first lens element 1 to the image plane 99.

BFL represents a distance along the optical axis I from the image-side surface of the last lens element counted from the object side A1 to the image side A2 to the image plane 99 (i.e., a distance along the optical axis I from the image-side surface 66 of the sixth lens element 6 to the image plane 99 in the first embodiment).

EFL represents the effective focal length of the optical imaging lens 10.

HFOV represents the half field of view of the optical imaging lens 10.

ImgH represents the image height of the optical imaging lens 10.

Fno represents the F-number of the optical imaging lens 10.

In addition, other definitions are as follows.

GFF represents an air gap along the optical axis I from the last lens element counted from the object side A1 to the image side A2 to the object-side surface 95 of the optical filter 9 (i.e., an air gap along the optical axis I from the sixth lens element 6 to the optical filter 9 in the first embodiment).

TF represents a thickness of the optical filter 9 along the optical axis I.

GFP represents a distance along the optical axis I from the image-side surface 96 of the optical filter 9 to the image plane 99, namely an air gap along the optical axis I from the optical filter 9 to the image plane 99.

Gallmax represents a largest air gap along the optical axis I between the first lens element 1 and the image plane 99.

Tmax represents a maximum lens element thickness along the optical axis I between the object side A1 and the image plane 99.

Tmin represents a minimum lens element thickness along the optical axis I between the object side A1 and the image plane 99.

Tavg represents an average lens element thickness of all of the lens elements along the optical axis I between the object side A1 and the image plane 99.

f1 represents a focal length of the first lens element 1.
f2 represents a focal length of the second lens element 2.
f3 represents a focal length of the third lens element 3.
f4 represents a focal length of the fourth lens element 4.
f5 represents a focal length of the fifth lens element 5.
f6 represents a focal length of the sixth lens element 6.
f7 represents a focal length of the seventh lens element 7.
f8 represents a focal length of the eighth lens element 8.
n1 represents a refractive index of the first lens element 1.
n2 represents a refractive index of the second lens element 2.
n3 represents a refractive index of the third lens element 3.
n4 represents a refractive index of the fourth lens element 4.
n5 represents a refractive index of the fifth lens element 5.
n6 represents a refractive index of the sixth lens element 6.
n7 represents a refractive index of the seventh lens element 7.
n8 represents a refractive index of the eighth lens element 8.
V1 represents an Abbe number of the first lens element 1, and the Abbe number also can be referred to as a dispersion coefficient.
V2 represents an Abbe number of the second lens element 2.
V3 represents an Abbe number of the third lens element 3.
V4 represents an Abbe number of the fourth lens element 4.
V5 represents an Abbe number of the fifth lens element 5.

V6 represents an Abbe number of the sixth lens element 6.

V7 represents an Abbe number of the seventh lens element 7.

V8 represents an Abbe number of the eighth lens element 8.

Then referring to FIG. 7A to FIG. 7D in a matched manner, the diagram of FIG. 7A illustrates a longitudinal spherical aberration of the first embodiment. Diagrams of FIGS. 7B and 7C respectively illustrate a field curvature aberration in a sagittal direction and a field curvature aberration in a tangential direction on the image plane 99 when wavelengths in the first embodiment are 470 nm, 555 nm and 650 nm. The diagram of FIG. 7D illustrates a distortion aberration on the image plane 99 when the wavelengths in the first embodiment are 470 nm, 555 nm and 650 nm. The longitudinal spherical aberration of the first embodiment is as shown in FIG. 7A, and a curve formed by each of the wavelengths is quite close to each other and is close to the middle, which indicates that off-axis rays at different heights of each of the wavelengths all concentrate near an imaging point. It can be seen from a deflection amplitude of the curve of each of the wavelengths that an imaging point deviation of the off-axis rays at different heights is controlled within the range of ±0.050 millimeter, and thus the first embodiment obviously improves the spherical aberration of the same wavelength in deed. In addition, three representative wavelengths are quite close to each other, which represents that imaging positions of imaging rays with different wavelengths have fairly concentrated, so that a chromatic aberration is also obviously improved.

In two field curvature aberration diagrams of FIGS. 7B and 7C, a focal length variation of the three representative wavelengths within a whole field range falls within ±0.04 millimeter, which indicates that an optical system of the first embodiment can effectively eliminate the aberration. The distortion aberration diagram of FIG. 7D shows that the distortion aberration of the first embodiment is maintained within the range of ±2%, which indicates that the distortion aberration of the first embodiment has met the requirement for the imaging quality of the optical system. Accordingly, it indicates that compared with an existing optical lens, the first embodiment can still provide good imaging quality under the condition that the effective focal length has been increased to be 20.520 millimeters. Therefore, the first embodiment can provide a long effective focal length and has good imaging quality while maintaining a good optical property.

FIG. 9 is a schematic diagram of an optical imaging lens according to a second embodiment of the disclosure. FIG. 10A to FIG. 10D illustrate a longitudinal spherical aberration and various aberrations of the optical imaging lens according to the second embodiment. Referring to FIG. 10 first, the second embodiment of the optical imaging lens 10 of the disclosure is approximately similar to the first embodiment, while the difference between the two is as follows: various optical data and parameters between the lens elements 1, 2, 3, 4, 5 and 6 are different more or less. In addition, in the present embodiment, the fourth lens element 4 has a negative refracting power. An optical axis region 461 of the image-side surface 46 of the fourth lens element 4 is concave, and a periphery region 463 of the image-side surface 46 of the fourth lens element 4 is concave. An optical axis region 661 of the image-side surface 66 of the sixth lens element 6 is convex, and a periphery region 663 of the image-side surface 66 of the sixth lens element 6 is convex. It should be noted herein that in order to clearly display the figure, a part of reference numerals of the optical axis region and the periphery region similar to those of the surface shape of the first embodiment are omitted in FIG. 9.

Detailed optical data of the optical imaging lens 10 according to the second embodiment are as shown in FIG. 11. In the optical imaging lens 10 according to the second embodiment, an EFL is 19.712 millimeters, an HFOV is 14.480 degrees, an Fno is 2.000, a system length is 35.100 millimeters, and an image height is 5.140 millimeters.

In addition, relations between various important parameters of the optical imaging lens 10 according to the second embodiment are as shown in FIGS. 21 and 22.

The longitudinal spherical aberration of the second embodiment is as shown in FIG. 10A, and an imaging point deviation of off-axis rays at different heights is controlled within the range of ±0.050 millimeter. In two field curvature aberration diagrams of FIGS. 10B and 10C, a focal length variation of three representative wavelengths within a whole field range falls within ±0.08 millimeter. The distortion aberration diagram of FIG. 10D shows that a distortion aberration of the second embodiment is maintained within the range of ±2%.

FIG. 12 is a schematic diagram of an optical imaging lens according to a third embodiment of the disclosure. FIG. 13A to FIG. 13D illustrate a longitudinal spherical aberration and various aberrations of the optical imaging lens according to the third embodiment. Referring to FIG. 12 first, the third embodiment of the optical imaging lens 10 of the disclosure is approximately similar to the first embodiment, while the difference between the two is as follows: various optical data and parameters between the lens elements 1, 2, 3, 4, 5 and 6 are different more or less. In addition, in the present embodiment, an aperture 0 is disposed between the third lens element 3 and the fourth lens element 4. An optical axis region 161 of the image-side surface 16 of the first lens element 1 is planar, and a periphery region 163 of the image-side surface 16 of the first lens element 1 is planar. The second lens element 2 has a positive refracting power. An optical axis region 251 of the object-side surface 25 of the second lens element 2 is convex, and a periphery region 253 of the object-side surface 25 of the second lens element 2 is convex. The third lens element 3 has a negative refracting power. An optical axis region 361 of the image-side surface 36 of the third lens element 3 is concave, and a periphery region 363 of the image-side surface 36 of the third lens element 3 is concave. An optical axis region 461 of the image-side surface 46 of the fourth lens element 4 is concave, and a periphery region 463 of the image-side surface 46 of the fourth lens element 4 is concave. An optical axis region 551 of the object-side surface 55 of the fifth lens element 5 is concave, and a periphery region 553 of the object-side surface 55 of the fifth lens element 5 is concave. An optical axis region 561 of the image-side surface 56 of the fifth lens element 5 is convex, and a periphery region 563 of the image-side surface 56 of the fifth lens element 5 is convex. The sixth lens element 6 has a positive refracting power. An optical axis region 651 of the object-side surface 65 of the sixth lens element 6 is convex, and a periphery region 653 of the object-side surface 65 of the sixth lens element 6 is convex. An optical axis region 661 of the image-side surface 66 of the sixth lens element 6 is planar, and a periphery region 663 of the image-side surface 66 of the sixth lens element 6 is planar. It should be noted herein that in order to clearly display the figure, a part of reference numerals of the optical axis region and the periphery region similar to those of the surface shape of the first embodiment are omitted in FIG. 12.

Detailed optical data of the optical imaging lens 10 according to the third embodiment are as shown in FIG. 14. In the optical imaging lens 10 according to the third embodiment, an EFL is 20.111 millimeters, an HFOV is 13.900 degrees, an Fno is 2.400, a system length is 35.100 millimeters, and an image height is 5.140 millimeters.

In addition, relations between various important parameters of the optical imaging lens 10 according to the third embodiment are as shown in FIGS. 21 and 22.

The longitudinal spherical aberration of the third embodiment is as shown in FIG. 13A, and an imaging point deviation of off-axis rays at different heights is controlled within the range of ±0.050 millimeter. In two field curvature aberration diagrams of FIGS. 13B and 13C, a focal length variation of three representative wavelengths within a whole field range falls within ±0.050 millimeter. The distortion aberration diagram of FIG. 13D shows that a distortion aberration of the third embodiment is maintained within the range of ±5%.

In addition, a thickness difference between an optical axis region and a periphery region of the lens according to the third embodiment is smaller than that of the first embodiment, and manufacturing is easy so that the yield is higher.

FIG. 15 is a schematic diagram of an optical imaging lens according to a fourth embodiment of the disclosure. FIG. 16A to FIG. 16D illustrate a longitudinal spherical aberration and various aberrations of the optical imaging lens according to the fourth embodiment. Referring to FIG. 15 first, the fourth embodiment of the optical imaging lens 10 of the disclosure is approximately similar to the first embodiment, while the difference between the two is as follows: various optical data and parameters between the lens elements 1, 2, 3, 4, 5 and 6 are different more or less. In the present embodiment, the optical imaging lens 10 further includes a seventh lens element 7. In addition, an aperture 0 is disposed between the third lens element 3 and the fourth lens element 4. An optical axis region 161 of the image-side surface 16 of the first lens element 1 is convex, and a periphery region 163 of the image-side surface 16 of the first lens element 1 is convex. The second lens element 2 has a positive refracting power. An optical axis region 251 of the object-side surface 25 of the second lens element 2 is convex, and a periphery region 253 of the object-side surface 25 of the second lens element 2 is convex. An optical axis region 261 of the image-side surface 26 of the second lens element 2 is convex, and a periphery region 263 of the image-side surface 26 of the second lens element 2 is convex. The third lens element 3 has a negative refracting power. An optical axis region 351 of the object-side surface 35 of the third lens element 3 is concave, and a periphery region 353 of the object-side surface 35 of the third lens element 3 is concave. The fourth lens element 4 has a negative refracting power. An optical axis region 461 of the image-side surface 46 of the fourth lens element 4 is concave, and a periphery region 463 of the image-side surface 46 of the fourth lens element 4 is concave. An optical axis region 551 of the object-side surface 55 of the fifth lens element 5 is concave, and a periphery region 553 of the object-side surface 55 of the fifth lens element 5 is concave. An optical axis region 561 of the image-side surface 56 of the fifth lens element 5 is convex, and a periphery region 563 of the image-side surface 56 of the fifth lens element 5 is convex. The sixth lens element 6 has a positive refracting power. An optical axis region 651 of the object-side surface 65 of the sixth lens element 6 is convex, and a periphery region 653 of the object-side surface 65 of the sixth lens element 6 is convex. The seventh lens element 7 is disposed between the sixth lens element 6 and the optical filter 9. The material of the seventh lens element 7 is glass. The seventh lens element 7 has a negative refracting power. An optical axis region 751 of the object-side surface 75 of the seventh lens element 7 is concave, and a periphery region 753 of the object-side surface 75 of the seventh lens element 7 is concave. An optical axis region 761 of the image-side surface 76 of the seventh lens element 7 is planar, and a periphery region 763 of the image-side surface 76 of the seventh lens element 7 is planar. It should be noted herein that in order to clearly display the figure, a part of reference numerals of the optical axis region and the periphery region similar to those of the surface shape of the first embodiment are omitted in FIG. 15.

Detailed optical data of the optical imaging lens 10 according to the fourth embodiment are as shown in FIG. 17. In the optical imaging lens 10 according to the fourth embodiment, an EFL is 20.050 millimeters, an HFOV is 13.55 degrees, an Fno is 2.250, a system length is 35.100 millimeters, and an image height is 5.150 millimeters.

In addition, relations between various important parameters of the optical imaging lens 10 according to the fourth embodiment are as shown in FIGS. 21 and 22.

The longitudinal spherical aberration of the fourth embodiment is as shown in FIG. 16A, and an imaging point deviation of off-axis rays at different heights is controlled within the range of ±0.050 millimeter. In two field curvature aberration diagrams of FIGS. 16B and 16C, a focal length variation of three representative wavelengths within a whole field range falls within ±0.1 millimeter. The distortion aberration diagram of FIG. 16D shows that a distortion aberration of the fourth embodiment is maintained within the range of ±8%.

It can be known from the above description that a thickness difference between an optical axis region and a periphery region of the lens according to the fourth embodiment is smaller than that of the first embodiment, and manufacturing is easy so that the yield is higher.

FIG. 18 is a schematic diagram of an optical imaging lens according to a fifth embodiment of the disclosure. FIG. 19A to FIG. 19D illustrate a longitudinal spherical aberration and various aberrations of the optical imaging lens according to the fifth embodiment. Referring to FIG. 18 first, the fifth embodiment of the optical imaging lens 10 of the disclosure is approximately similar to the first embodiment, while the difference between the two is as follows: various optical data and parameters between the lens elements 1, 2, 3, 4, 5 and 6 are different more or less. In the present embodiment, the optical imaging lens 10 further includes a seventh lens element 7 and an eighth lens element 8. In addition, an aperture 0 is disposed between the fourth lens element 4 and the fifth lens element 5. The second lens element 2 has a positive refracting power. An optical axis region 251 of the object-side surface 25 of the second lens element 2 is convex, and a periphery region 253 of the object-side surface 25 of the second lens element 2 is convex. The fourth lens element 4 has a negative refracting power. An optical axis region 451 of the object-side surface 45 of the fourth lens element 4 is concave, and a periphery region 453 of the object-side surface 45 of the fourth lens element 4 is concave. An optical axis region 461 of the image-side surface 46 of the fourth lens element 4 is concave, and a periphery region 463 of the image-side surface 46 of the fourth lens element 4 is concave. The fifth lens element 5 has a negative refracting power. An optical axis region 551 of the object-side surface 55 of the fifth lens element 5 is concave, and a periphery region 553 of the object-side surface 55 of the fifth lens element 5 is concave. An optical axis region 561 of the image-side surface 56 of the fifth lens element 5 is convex, and a periphery region 563 of the image-side surface 56 of the fifth lens element 5 is convex. An optical axis region 661 of the image-side surface 66 of the sixth lens element 6 is convex, and a periphery region 663 of the image-side surface 66 of the sixth lens element 6 is convex. The seventh lens element 7 is disposed between the sixth lens element 6 and the eighth lens element 8. The material of the seventh lens element 7 is glass. The seventh lens element 7 has a positive refracting power. An optical axis region 751 of the object-side surface 75 of the seventh lens element 7 is concave, and a periphery region 753 of the object-side surface 75 of the seventh lens element 7 is concave. An optical axis region 761 of the image-side surface 76 of the seventh lens element 7 is convex, and a periphery region 763 of the image-side surface 76 of the seventh lens element 7 is convex. The eighth lens element 8 is disposed between the seventh lens element 7 and the optical filter 9. The material of the eighth lens element 8 is glass. The eighth lens element 8 has a positive refracting power. An optical axis region 851 of the object-side surface 85 of the eighth lens element 8 is convex, and a periphery region 853 of the object-side surface 85 of the eighth lens element 8 is convex. An optical axis region 861 of an image-side surface 86 of the eighth lens element 8 is planar, and a periphery region 863 of the image-side surface 86 of the eighth lens element 8 is planar. It should be noted herein that in order to clearly display the figure, a part of reference numerals of the optical axis region and the periphery region similar to those of the surface shape of the first embodiment are omitted in FIG. 18.

In addition, in one embodiment, the third lens element 3 and the fourth lens element 4 may be cemented lens elements.

Detailed optical data of the optical imaging lens 10 according to the fifth embodiment are as shown in FIG. 20. In the optical imaging lens 10 according to the fifth embodiment, an EFL is 21.631 millimeters, an HFOV is 13.37 degrees, an Fno is 2.150, a system length is 35.000 millimeters, and an image height is 5.130 millimeters.

In addition, relations between various important parameters of the optical imaging lens 10 according to the fifth embodiment are as shown in FIGS. 21 and 22.

The longitudinal spherical aberration of the fifth embodiment is as shown in FIG. 19A, and an imaging point deviation of off-axis rays at different heights is controlled within the range of ±0.050 millimeter. In two field curvature aberration diagrams of FIGS. 19B and 19C, a focal length variation in a sagittal direction of three representative wavelengths within a whole field range falls within ±0.04 millimeter, and a focal length variation in a tangential direction falls within ±0.08 millimeter. The distortion aberration diagram of FIG. 19D shows that a distortion aberration of the fifth embodiment is maintained within the range of ±0.5%.

It can be known from the above description that the HFOV of the fifth embodiment is less than that of the first embodiment, so that a magnifying power is larger. The distortion aberration of the fifth embodiment is superior to that of the first embodiment.

Then referring to FIGS. 21 and 22 in a matched manner, FIGS. 21 and 22 are tabular drawings of various optical parameters of the first embodiment to the fifth embodiment.

The optical imaging lens 10 according to the embodiments of the disclosure further satisfies the following conditions, which is beneficial to enabling the EFL and various optical parameters to be maintained at proper values so as to avoid the situation that any over-large parameter is not conductive to correction of an overall aberration of the optical imaging system, or any over-small parameter affects assembly or increases manufacturing difficulty.

The optical imaging lens 10 according to the embodiments of the disclosure satisfies the conditions of (EFL+BFL)/Gallmax≤3.700, wherein an exemplary range is 2.200≤(EFL+BFL)/Gallmax≤3.700.

The optical imaging lens 10 according to the embodiments of the disclosure satisfies the conditions of (EFL+BFL)/Fno≤16.000 millimeters, wherein an exemplary range is 9.600 millimeters≤(EFL+BFL)/Fno≤16.000 millimeters.

In order to shorten the length of a lens element system and ensure imaging quality, while considering the manufacturing difficulty, the means that the air gaps between the lens elements are reduced or the lens element thicknesses of the lens elements are properly reduced are taken, and if numeric value limits of the following conditions are satisfied, the optical imaging lens 10 according to the embodiments of the disclosure may have an exemplary configuration.

The optical imaging lens 10 according to the embodiments of the disclosure satisfies the conditions of AAG/Tavg≤8.000, and an exemplary range is 4.100≤AAG/Tavg≤8.000.

The optical imaging lens 10 according to the embodiments of the disclosure satisfies the conditions of Gallmax/Tmax≤3.000, and an exemplary range is 1.000≤Gallmax/Tmax≤3.000.

The optical imaging lens 10 according to the embodiments of the disclosure satisfies the conditions of Tmax/Tmin≥4.000, and an exemplary range is 4.000≤Tmax/Tmin≤13.000.

The optical imaging lens 10 according to the embodiments of the disclosure satisfies the conditions of ALT/(G34+G45)≥7.000, and an exemplary range is 7.000≤ALT/(G34+G45)≤14.600.

The optical imaging lens 10 according to the embodiments of the disclosure satisfies the conditions of (T1+G12)/(T2+G23+T3)≥1.500, and an exemplary range is 1.500≤(T1+G12)/(T2+G23+T3)≤4.700.

The optical imaging lens 10 according to the embodiments of the disclosure satisfies the conditions of AAG/Tmin≤21.000, and an exemplary range is 8.500≤AAG/Tmin≤21.000.

The optical imaging lens 10 according to the embodiments of the disclosure satisfies the conditions of TL/Tmax≤8.000, and an exemplary range is 3.400≤TL/Tmax≤8.000.

The optical imaging lens 10 according to the embodiments of the disclosure satisfies the conditions of ALT/(T1+G12+T2)≤2.000, and an exemplary range is 0.850≤ALT/(T1+G12+T2)≤2.000.

The optical imaging lens 10 according to the embodiments of the disclosure satisfies the conditions of (T4+T5)/(T2+T6)≥2.100, and an exemplary range is 2.100≤(T4+T5)/(T2+T6)≤4.000.

The optical imaging lens 10 according to the embodiments of the disclosure satisfies the conditions of TL/(G34+G56)≥9.800, and an exemplary range is 9.800≤TL/(G34+G56)≤28.900.

The optical imaging lens 10 according to the embodiments of the disclosure satisfies the conditions of AAG/(G12+G34)≤2.500, and an exemplary range is 0.900≤AAG/(G12+G34)≤2.500.

The optical imaging lens 10 according to the embodiments of the disclosure satisfies the conditions of TTL/(Tmax+Tmin)≤8.300, and an exemplary range is 3.600≤TTL(Tmax+Tmin)≤8.300.

The optical imaging lens 10 according to the embodiments of the disclosure satisfies the conditions of TL/(G12+G56)≤4.000, and an exemplary range is 1.900≤TL/(G12+G56)≤4.000.

The optical imaging lens 10 according to the embodiments of the disclosure satisfies the conditions of (T4+G45+T5)/(T1+T6)≥2.100, and an exemplary range is 2.100≤(T4+G45+T5)/(T1+T6)≤3.700.

In addition, any combined relations of the parameters of the embodiments may be selected to increase limitations to the lens so as to facilitate the design of lens with the same framework of the disclosure. In view of unpredictability of the design of an optical system, under the framework of the embodiments of the disclosure, satisfying the above conditions can better shorten the length, effectively increase the EFL, increase the image height and improve the imaging quality or increase the assembly yield of an optical imaging lens system according to the embodiments of the disclosure so as to overcome the defects of the prior art. The lens elements according to the embodiments of the disclosure adopt glass so as to prolong the service life of the optical imaging lens and effectively pass environment tests.

The example limiting relations described above may also be optionally combined in different numbers so as to be applied to implementations of the disclosure, and are not limited to this. When the disclosure is implemented, besides the forgoing relations, more other detail structures such as concave-convex surface arrangement of the lens elements may be additionally designed for a single lens element or widely for a plurality of lens elements, so as to enhance the control over the performance and/or resolution of the system. It should be noted that the details need to be optionally combined to be applied to other embodiments of the disclosure under the circumstance of no conflict.

Based on the forgoing, the optical imaging lens 10 according to the embodiments of the disclosure can realize the following effects and advantages.

1. The longitudinal spherical aberrations, astigmatic aberrations and distortion of all the embodiments of the disclosure meet usage specifications. In addition, the off-axis rays at different heights of the three representative red, green and blue wavelengths all concentrate near the imaging point, and it can be seen from the deflection amplitude of each curve that imaging point deviations of the off-axis rays at different heights are all controlled so as to achieve good inhibiting ability to spherical aberrations, aberrations and distortion. Further referring to imaging quality data, the three representative red, green and blue wavelengths are quite close to each other, which shows that the disclosure has good concentricity of light rays with different wavelengths in various states and has excellent dispersion inhibiting ability. Based on the above, the disclosure can produce excellent imaging quality by virtue of the design and mutual matching of the lens elements.

2. Through the design of the parameters of the lens according to the embodiments of the disclosure, for example, the first lens element has the positive refracting power, when the optical imaging lens satisfies: Gallmax/Fno≥3.600 millimeters, EFL/ImgH≥3.200, and one of Gallmax/Tavg≥3.300 and EFL/Gallmax≤4.000, the whole optical imaging lens can effectively have good imaging quality while a luminous flux and the EFL are increased. The exemplary implementation ranges of Gallmax/Fno, EFL/ImgH, Gallmax/Tavg and EFL/Gallmax are respectively 3.600 millimeters≤Gallmax/Fno≤6.300 millimeters, 3.200≤EFL/ImgH≤4.600, 3.300≤Gallmax/Tavg≤5.500 and 1.600≤EFL/Gallmax≤4.000.

In addition, while Gallmax/Fno≥3.600 millimeters, EFL/ImgH≥2.200, EFL/HFOV≤3.000 millimeters/degree and TTL/BFL≥4.500, besides maintaining good imaging quality, when EFL/ImgH≥2.200, the EFL can be further increased and the purposes of correcting the aberrations of the optical system and lowering distortion are achieved. The exemplary implementation ranges of EFL/ImgH, EFL/HFOV and TTL/BFL are 2.200≤EFL/ImgH≤4.600, 1.200 millimeters/degree≤EFL/HFOV≤3.000 millimeters/degree and 4.500≤TTL/BFL≤9.650.

All numeric value ranges including maximum and minimum values obtained according to combination proportional relations of the optical parameters disclosed by all the embodiments of the disclosure can be implemented accordingly.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. An optical imaging lens, comprising a first lens element, a second lens element, a third lens element, a fourth lens element, a fifth lens element, and a sixth lens element sequentially along an optical axis from an object side to an image side, wherein each of the first lens element to the sixth lens element comprises an object-side surface facing the object side and allowing imaging rays to pass through and an image-side surface facing the image side and allowing the imaging rays to pass through, the first lens element is arranged to be a lens element in a first order from the object side to the image side and has a positive refracting power;
the second lens element is arranged to be a lens element in a second order from the object side to the image side;
the third lens element is arranged to be a lens element in a third order from the object side to the image side;
the fourth lens element is arranged to be a lens element in a fourth order from the object side to the image side;
the fifth lens element is arranged to be a lens element in a fifth order from the object side to the image side;
the sixth lens element is arranged to be a lens element in a sixth order from the object side to the image side; and
the optical imaging lens satisfies conditions of Gallmax/Fno≥3.600 millimeters, EFL/ImgH≥3.200, Gallmax/Tavg≥3.300, and a thickness of the fifth lens element along the optical axis is greater than an air gap along the optical axis between the fourth lens element and the fifth lens element, wherein Gallmax represents a largest air gap along the optical axis between the first lens element and an image plane, Fno represents an F-number of the optical imaging lens, EFL represents an effective focal length of the optical imaging lens, ImgH represents an image height of the optical imaging lens, and Tavg represents an average lens element thickness of all of the lens elements along the optical axis from the object side to the image plane, wherein the optical imaging lens further satisfies conditions of $(T4+G45+T5)/(T1+T6) \geq 2.100$, wherein T1 represents a thickness of the first lens element along the optical axis, T4 represents a thickness of the fourth lens element along the optical axis, T5 represents the thickness of the fifth lens element along the optical axis, T6 represents a thickness of the sixth lens element along the optical axis, and G45 represents the air gap along the optical axis between the fourth lens element and the fifth lens element.

2. The optical imaging lens according to claim 1, wherein the optical imaging lens further satisfies conditions of $(EFL+BFL)/Gallmax \leq 3.700$, wherein BFL represents a distance along the optical axis from an image-side surface of a last lens element counted from the object side to the image side to the image plane.

3. The optical imaging lens according to claim 1, wherein the optical imaging lens further satisfies conditions of $TTL/(Tmax+Tmin) \leq 8.300$, wherein TTL represents a distance along the optical axis from the object-side surface of the first lens element to the image plane, Tmax represents a maximum lens element thickness along the optical axis between the object side and the image plane, and Tmin represents a minimum lens element thickness along the optical axis between the object side and the image plane.

4. The optical imaging lens according to claim 1, wherein the optical imaging lens further satisfies conditions of $TTL/BFL \geq 4.500$, wherein TTL represents a distance along the optical axis from the object-side surface of the first lens element to the image plane, and BFL represents a distance along the optical axis from an image-side surface of a last lens element counted from the object side to the image side to the image plane.

5. The optical imaging lens according to claim 1, wherein the optical imaging lens further satisfies conditions of $AAG/Tavg \leq 8.000$, wherein AAG represents a sum of air gaps along the optical axis between the first lens element and a last lens element counted from the object side to the image side along the optical axis, and Tavg represents an average lens element thickness of all of the lens elements along the optical axis from the object side to the image plane.

6. The optical imaging lens according to claim 1, wherein the optical imaging lens further satisfies conditions of $Gallmax/Tmax \leq 3.000$, wherein Tmax represents a maximum lens element thickness along the optical axis between the object side and the image plane.

7. The optical imaging lens according to claim 1, wherein the optical imaging lens further satisfies conditions of $(EFL+BFL)/Fno \leq 16.000$ millimeters, wherein BFL represents a distance along the optical axis from an image-side surface of a last lens element counted from the object side to the image side to the image plane.

8. An optical imaging lens, comprising a first lens element, a second lens element, a third lens element, a fourth lens element, a fifth lens element, and a sixth lens element sequentially along an optical axis from an object side to an image side, wherein each of the first lens element to the sixth lens element comprises an object-side surface facing the object side and allowing imaging rays to pass through and an image-side surface facing the image side and allowing the imaging rays to pass through, the first lens element is arranged to be a lens element in a first order from the object side to the image side and has a positive refracting power;
the second lens element is arranged to be a lens element in a second order from the object side to the image side;
the third lens element is arranged to be a lens element in a third order from the object side to the image side;
the fourth lens element is arranged to be a lens element in a fourth order from the object side to the image side;
the fifth lens element is arranged to be a lens element in a fifth order from the object side to the image side;
the sixth lens element is arranged to be a lens element in a sixth order from the object side to the image side; and
the optical imaging lens satisfies conditions of $Gallmax/Fno \geq 3.600$ millimeters, $EFL/ImgH \geq 3.200$, $EFL/Gallmax \leq 4.000$, and a thickness of the fifth lens element along the optical axis is greater than an air gap along the optical axis between the fourth lens element and the fifth lens element, wherein Gallmax represents a largest air gap along the optical axis between the first lens element and an image plane, Fno represents an F-number of the optical imaging lens, EFL represents an effective focal length of the optical imaging lens, and ImgH represents an image height of the optical imaging lens,
wherein the optical imaging lens further satisfies conditions of $(T4+G45+T5)/(T1+T6) > 2.100$, wherein T1 represents a thickness of the first lens element along the optical axis, T4 represents a thickness of the fourth lens element along the optical axis, T5 represents the thickness of the fifth lens element along the optical axis, T6 represents a thickness of the sixth lens element along the optical axis, and G45 represents the air gap along the optical axis between the fourth lens element and the fifth lens element.

9. The optical imaging lens according to claim 8, wherein the optical imaging lens further satisfies conditions of $Tmax/Tmin \geq 4.000$, wherein Tmax represents a maximum lens element thickness along the optical axis between the object side and the image plane, and Tmin represents a minimum lens element thickness along the optical axis between the object side and the image plane.

10. The optical imaging lens according to claim 8, wherein the optical imaging lens further satisfies conditions of $ALT/(G34+G45) \geq 7.000$, wherein ALT represents a sum of all lens element thicknesses along the optical axis, and G34 represents an air gap along the optical axis between the third lens element and the fourth lens element.

11. The optical imaging lens according to claim 8, wherein the optical imaging lens further satisfies conditions of $(T1+G12)/(T2+G23+T3) \geq 1.500$, wherein T2 represents a thickness of the second lens element along the optical axis, T3 represents a thickness of the third lens element along the optical axis, G12 represents an air gap along the optical axis between the first lens element and the second lens element, and G23 represents an air gap along the optical axis between the second lens element and the third lens element.

12. The optical imaging lens according to claim 8, wherein the optical imaging lens further satisfies conditions of $AAG/Tmin \leq 21.000$, wherein AAG represents a sum of air gaps along the optical axis between the first lens element and a last lens element counted from the object side to the image side, and Tmin represents a minimum lens element thickness along the optical axis between the object side and the image plane.

13. The optical imaging lens according to claim 8, wherein the optical imaging lens further satisfies conditions of $TL/Tmax \leq 8.000$, wherein TL represents a distance along the optical axis from the object-side surface of the first lens element to an image-side surface of a last lens element counted from the object side to the image side, and Tmax represents a maximum lens element thickness along the optical axis between the object side and the image plane.

14. The optical imaging lens according to claim 8, wherein the optical imaging lens further satisfies conditions of ALT/(T1+G12+T2)≤2.000, wherein ALT represents a sum of all lens element thicknesses along the optical axis, T2 represents a thickness of the second lens element along the optical axis, and G12 represents an air gap along the optical axis between the first lens element and the second lens element.

15. An optical imaging lens, comprising a first lens element, a second lens element, a third lens element, a fourth lens element, a fifth lens element, and a sixth lens element sequentially along an optical axis from an object side to an image side, wherein each of the first lens element to the sixth lens element comprises an object-side surface facing the object side and allowing imaging rays to pass through and an image-side surface facing the image side and allowing the imaging rays to pass through, the first lens element is arranged to be a lens element in a first order from the object side to the image side;
the second lens element is arranged to be a lens element in a second order from the object side to the image side;
the third lens element is arranged to be a lens element in a third order from the object side to the image side;
the fourth lens element is arranged to be a lens element in a fourth order from the object side to the image side;
the fifth lens element is arranged to be a lens element in a fifth order from the object side to the image side;
the sixth lens element is arranged to be a lens element in a sixth order from the object side to the image side; and
the optical imaging lens satisfies conditions of Gallmax/Fno≥3.600 millimeters, EFL/ImgH≥2.200, EFL/HFOV≤3.000 millimeters/degree, TTL/BFL≥4.500, and a thickness of the fifth lens element along the optical axis is greater than an air gap along the optical axis between the fourth lens element and the fifth lens element, wherein Gallmax represents a largest air gap along the optical axis between the first lens element and an image plane, Fno represents an F-number of the optical imaging lens, EFL represents an effective focal length of the optical imaging lens, ImgH represents an image height of the optical imaging lens, HFOV represents a half field of view of the optical imaging lens, TTL represents a distance along the optical axis from the object-side surface of the first lens element to the image plane, and BFL represents a distance along the optical axis from an image-side surface of a last lens element counted from the object side to the image side to the image plane, wherein the optical imaging lens further satisfies conditions of (T4+G45+T5)/(T1+T6)≥2.100, wherein T1 represents a thickness of the first lens element along the optical axis, T4 represents a thickness of the fourth lens element along the optical axis, T5 represents the thickness of the fifth lens element along the optical axis, T6 represents a thickness of the sixth lens element along the optical axis, and G45 represents the air gap along the optical axis between the fourth lens element and the fifth lens element.

16. The optical imaging lens according to claim 15, wherein the optical imaging lens further satisfies conditions of (T4+T5)/(T2+T6)≥2.100, wherein T2 represents a thickness of the second lens element along the optical axis.

17. The optical imaging lens according to claim 15, wherein the optical imaging lens further satisfies conditions of TL/(G34+G56)≥10.000, wherein TL represents a distance along the optical axis from the object-side surface of the first lens element to the image-side surface of the last lens element counted from the object side to the image side, G34 represents an air gap along the optical axis between the third lens element and the fourth lens element, and G56 represents an air gap along the optical axis between the fifth lens element and the sixth lens element.

18. The optical imaging lens according to claim 15, wherein the optical imaging lens further satisfies conditions of AAG/(G12+G34)≤2.500, wherein AAG represents a sum of air gaps along the optical axis between the first lens element and the last lens element counted from the object side to the image side, G12 represents an air gap along the optical axis between the first lens element and the second lens element, and G34 represents an air gap along the optical axis between the third lens element and the fourth lens element.

19. The optical imaging lens according to claim 15, wherein the optical imaging lens further satisfies conditions of TL/(G12+G56)≤4.000, wherein TL represents a distance along the optical axis from the object-side surface of the first lens element to the image-side surface of the last lens element counted from the object side to the image side, G12 represents an air gap along the optical axis between the first lens element and the second lens element, and G56 represents an air gap along the optical axis between the fifth lens element and the sixth lens element.

* * * * *